(12) United States Patent
Kuiper et al.

(10) Patent No.: US 9,176,783 B2
(45) Date of Patent: Nov. 3, 2015

(54) IDLE TRANSITIONS SAMPLING WITH EXECUTION CONTEXT

(75) Inventors: Kean G. Kuiper, Round Rock, TX (US); Frank E. Levine, Austin, TX (US); Enio M. Pineda, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 600 days.

(21) Appl. No.: 12/786,381

(22) Filed: May 24, 2010

(65) Prior Publication Data

US 2011/0289361 A1  Nov. 24, 2011

(51) Int. Cl.
*G06F 9/46* (2006.01)
*G06F 9/44* (2006.01)
*G06F 9/50* (2006.01)

(52) U.S. Cl.
CPC .......... *G06F 9/5033* (2013.01); *G06F 2201/86* (2013.01)

(58) Field of Classification Search
None
See application file for complete search history.

(56) References Cited

U.S. PATENT DOCUMENTS

| | | |
|---|---|---|
| 5,305,454 A | 4/1994 | Record et al. |
| 5,379,432 A | 1/1995 | Orton et al. |
| 5,404,529 A | 4/1995 | Chernikoff et al. |
| 5,465,328 A | 11/1995 | Dievendorff et al. |
| 5,473,777 A | 12/1995 | Moeller et al. |
| 5,475,845 A | 12/1995 | Orton et al. |
| 5,544,318 A | 8/1996 | Schmitz et al. |
| 5,625,359 A | 4/1997 | Wilson et al. |
| 5,682,537 A | 10/1997 | Davies et al. |
| 5,751,789 A | 5/1998 | Farris et al. |
| 5,764,241 A | 6/1998 | Elliott et al. |
| 5,768,500 A | 6/1998 | Agrawal et al. |
| 5,913,213 A | 6/1999 | Wikstrom et al. |
| 5,930,516 A | 7/1999 | Watts et al. |
| 6,002,872 A | 12/1999 | Alexander, III et al. |
| 6,012,094 A | 1/2000 | Leymann et al. |

(Continued)

FOREIGN PATENT DOCUMENTS

| | | |
|---|---|---|
| CN | 1614555 | 5/2005 |
| EP | 649084 A1 | 4/1995 |

(Continued)

OTHER PUBLICATIONS

Asokan-et al.; "Providing Time-and Space-Efficient Procedure Calls for Asynchronous Software Thread Integration"; pp. 167-187; Sep. 2004.

(Continued)

*Primary Examiner* — Hung Q Pham
(74) *Attorney, Agent, or Firm* — Janaki K. Davda; Konrad, Raynes, Davda & Victor LLP

(57) ABSTRACT

A process generates a sample based on an event. The process identifies, with a dispatch monitor, a next dispatched monitored thread that is dispatched by a current processor. The process sets a processor affinity of the next dispatched monitored thread such that the next dispatched monitored thread runs only on the current processor without being able to migrate to a different processor. The process also retrieves, with a sampled thread that runs on the current processor, a next dispatched monitored thread call stack after the processor affinity of the next dispatched monitored thread has been set to the processor. The process restores the processor affinity of the next dispatched monitored thread after the next dispatched monitored thread call stack has been obtained.

25 Claims, 12 Drawing Sheets

(56) References Cited

U.S. PATENT DOCUMENTS

| | | | |
|---|---|---|---|
| 6,055,492 A | 4/2000 | Alexander, III et al. |
| 6,108,654 A | 8/2000 | Chan et al. |
| 6,112,225 A | 8/2000 | Kraft et al. |
| 6,125,363 A | 9/2000 | Buzzeo et al. |
| 6,128,611 A | 10/2000 | Doan et al. |
| 6,158,024 A | 12/2000 | Mandal |
| 6,178,440 B1 | 1/2001 | Foster et al. |
| 6,199,075 B1 | 3/2001 | Ungar et al. |
| 6,233,585 B1 | 5/2001 | Gupta et al. |
| 6,338,159 B1 | 1/2002 | Alexander, III et al. |
| 6,438,512 B1 | 8/2002 | Miller |
| 6,442,572 B2 | 8/2002 | Leymann et al. |
| 6,449,614 B1 | 9/2002 | Marcotte |
| 6,553,564 B1 | 4/2003 | Alexander, III et al. |
| 6,601,233 B1 | 7/2003 | Underwood |
| 6,625,602 B1 | 9/2003 | Meredith et al. |
| 6,633,897 B1 | 10/2003 | Browning et al. |
| 6,651,243 B1 | 11/2003 | Berry et al. |
| 6,654,948 B1 | 11/2003 | Konuru et al. |
| 6,658,652 B1 | 12/2003 | Alexander, III et al. |
| 6,662,358 B1 | 12/2003 | Berry et al. |
| 6,662,359 B1 | 12/2003 | Berry et al. |
| 6,681,230 B1 | 1/2004 | Blott et al. |
| 6,697,802 B2 | 2/2004 | Ma et al. |
| 6,697,935 B1 | 2/2004 | Borkenhagen et al. |
| 6,728,955 B1 | 4/2004 | Berry et al. |
| 6,728,959 B1 | 4/2004 | Merkey |
| 6,742,016 B1 | 5/2004 | Bhoj et al. |
| 6,751,789 B1 | 6/2004 | Berry et al. |
| 6,857,120 B1 | 2/2005 | Arnold et al. |
| 6,874,074 B1 | 3/2005 | Burton et al. |
| 6,880,086 B2 | 4/2005 | Kidder et al. |
| 6,904,594 B1 | 6/2005 | Berry et al. |
| 6,931,354 B2 | 8/2005 | Jones et al. |
| 6,941,552 B1 | 9/2005 | Beadle et al. |
| 6,954,922 B2 | 10/2005 | Liang |
| 6,976,263 B2 | 12/2005 | Delaney |
| 6,993,246 B1 | 1/2006 | Pan et al. |
| 7,000,047 B2 | 2/2006 | Nguyen et al. |
| 7,020,696 B1 | 3/2006 | Perry et al. |
| 7,028,298 B1 | 4/2006 | Foote |
| 7,047,258 B2 | 5/2006 | Balogh et al. |
| 7,093,081 B2 | 8/2006 | DeWitt, Jr. et al. |
| 7,114,036 B2 | 9/2006 | DeWitt, Jr. et al. |
| 7,114,150 B2 | 9/2006 | Dimpsey et al. |
| 7,162,666 B2 | 1/2007 | Bono |
| 7,178,145 B2 | 2/2007 | Bono |
| 7,206,848 B1 | 4/2007 | Zara et al. |
| 7,222,119 B1 | 5/2007 | Ghemawat et al. |
| 7,257,657 B2 | 8/2007 | DeWitt, Jr. et al. |
| 7,278,141 B2 | 10/2007 | Accapadi et al. |
| 7,284,238 B2 | 10/2007 | Inagaki et al. |
| 7,296,130 B2 | 11/2007 | Dimpsey et al. |
| 7,321,965 B2 | 1/2008 | Kissell |
| 7,325,108 B2 | 1/2008 | Tuel |
| 7,398,518 B2 | 7/2008 | Dichter |
| 7,426,730 B2 | 9/2008 | Mathews et al. |
| 7,458,078 B2 | 11/2008 | DeWitt, Jr. et al. |
| 7,474,991 B2 | 1/2009 | DeWitt, Jr. et al. |
| 7,496,918 B1 | 2/2009 | Dice et al. |
| 7,526,757 B2 | 4/2009 | Levine et al. |
| 7,529,914 B2 | 5/2009 | Saha et al. |
| 7,574,587 B2 | 8/2009 | DeWitt, Jr. et al. |
| 7,584,332 B2 | 9/2009 | Kogge et al. |
| 7,587,364 B2 | 9/2009 | Crumbach et al. |
| 7,610,585 B2 | 10/2009 | Shpeisman et al. |
| 7,624,137 B2 | 11/2009 | Bacon et al. |
| 7,653,895 B1 | 1/2010 | James-Roxby et al. |
| 7,688,867 B1 | 3/2010 | Kizhepat |
| 7,689,867 B2 | 3/2010 | Rosenbluth et al. |
| 7,716,647 B2 | 5/2010 | Loh et al. |
| 7,721,268 B2 | 5/2010 | Loh et al. |
| 7,779,238 B2 | 8/2010 | Kosche et al. |
| 7,788,664 B1 | 8/2010 | Janakiraman et al. |
| 7,921,075 B2 | 4/2011 | Herness et al. |
| 7,921,875 B2 | 4/2011 | Moriiki et al. |
| 7,925,473 B2 | 4/2011 | DeWitt, Jr. et al. |
| 7,962,913 B2 | 6/2011 | Accapadi et al. |
| 7,962,924 B2 | 6/2011 | Kuiper et al. |
| 7,996,593 B2 | 8/2011 | Blackmore et al. |
| 7,996,629 B2 | 8/2011 | Wan et al. |
| 8,018,845 B2 | 9/2011 | Ruello et al. |
| 8,024,735 B2 | 9/2011 | Rudd et al. |
| 8,117,599 B2 | 2/2012 | Edmark et al. |
| 8,117,618 B2 | 2/2012 | Holloway et al. |
| 8,132,170 B2 | 3/2012 | Kuiper et al. |
| 8,136,124 B2 | 3/2012 | Kosche et al. |
| 8,141,053 B2 | 3/2012 | Levine |
| 8,156,495 B2 | 4/2012 | Chew et al. |
| 8,191,049 B2 | 5/2012 | Levine et al. |
| 8,286,134 B2 | 10/2012 | Jones et al. |
| 8,381,215 B2* | 2/2013 | Johnson et al. ............... 718/102 |
| 8,566,795 B2 | 10/2013 | Dewitt, Jr. et al. |
| 2002/0007363 A1 | 1/2002 | Vaitzblit |
| 2002/0016729 A1 | 2/2002 | Breitenbach et al. |
| 2002/0038332 A1 | 3/2002 | Alverson et al. |
| 2002/0073103 A1 | 6/2002 | Bottomley et al. |
| 2003/0004970 A1 | 1/2003 | Watts |
| 2003/0023655 A1 | 1/2003 | Sokolov et al. |
| 2003/0061256 A1 | 3/2003 | Mathews et al. |
| 2003/0083912 A1 | 5/2003 | Covington, III et al. |
| 2003/0233394 A1 | 12/2003 | Rudd et al. |
| 2004/0068501 A1 | 4/2004 | McGoveran |
| 2004/0093510 A1 | 5/2004 | Nurmela |
| 2004/0142679 A1 | 7/2004 | Kearns et al. |
| 2004/0148594 A1 | 7/2004 | Williams |
| 2004/0162741 A1 | 8/2004 | Flaxer et al. |
| 2004/0163077 A1 | 8/2004 | Dimpsey et al. |
| 2004/0178454 A1 | 9/2004 | Kuroda et al. |
| 2004/0193510 A1 | 9/2004 | Catahan, Jr. et al. |
| 2004/0215614 A1 | 10/2004 | Doyle et al. |
| 2004/0215768 A1 | 10/2004 | Oulu et al. |
| 2004/0216112 A1 | 10/2004 | Accapadi et al. |
| 2004/0220931 A1 | 11/2004 | Guthridge et al. |
| 2004/0220932 A1 | 11/2004 | Seeger et al. |
| 2004/0220933 A1 | 11/2004 | Walker |
| 2004/0268316 A1 | 12/2004 | Fisher et al. |
| 2005/0021354 A1 | 1/2005 | Brendle et al. |
| 2005/0080806 A1 | 4/2005 | Doganata et al. |
| 2005/0086455 A1 | 4/2005 | DeWitt, Jr. et al. |
| 2005/0091663 A1 | 4/2005 | Bagsby |
| 2005/0102493 A1 | 5/2005 | DeWitt et al. |
| 2005/0102673 A1 | 5/2005 | DeWitt et al. |
| 2005/0138443 A1 | 6/2005 | Cooper |
| 2005/0149585 A1 | 7/2005 | Bacon et al. |
| 2005/0155018 A1 | 7/2005 | DeWitt, Jr. et al. |
| 2005/0155019 A1 | 7/2005 | Levine et al. |
| 2005/0166187 A1 | 7/2005 | Das et al. |
| 2005/0204349 A1 | 9/2005 | Lewis et al. |
| 2005/0246461 A1* | 11/2005 | Accapadi et al. ............. 710/200 |
| 2005/0256961 A1 | 11/2005 | Alon et al. |
| 2005/0262130 A1 | 11/2005 | Mohan |
| 2005/0273757 A1 | 12/2005 | Anderson |
| 2005/0273782 A1 | 12/2005 | Shpeisman et al. |
| 2006/0004757 A1 | 1/2006 | Watts |
| 2006/0023642 A1 | 2/2006 | Roskowski et al. |
| 2006/0031837 A1 | 2/2006 | Theurer |
| 2006/0059486 A1 | 3/2006 | Loh et al. |
| 2006/0072563 A1 | 4/2006 | Regnier et al. |
| 2006/0080486 A1 | 4/2006 | Yan |
| 2006/0095571 A1 | 5/2006 | Gilgen et al. |
| 2006/0130001 A1 | 6/2006 | Beuch et al. |
| 2006/0136914 A1 | 6/2006 | Marascio et al. |
| 2006/0149877 A1 | 7/2006 | Pearson |
| 2006/0167955 A1 | 7/2006 | Vertes |
| 2006/0184769 A1 | 8/2006 | Floyd et al. |
| 2006/0212657 A1 | 9/2006 | Tuel |
| 2006/0218290 A1 | 9/2006 | Lin et al. |
| 2006/0259911 A1 | 11/2006 | Weinrich et al. |
| 2006/0282400 A1 | 12/2006 | Kalavacharla et al. |
| 2006/0282707 A1 | 12/2006 | Rosenbluth et al. |
| 2007/0006168 A1 | 1/2007 | Dimpsey et al. |
| 2007/0033589 A1 | 2/2007 | Nicholas et al. |
| 2007/0150904 A1 | 6/2007 | Kim et al. |

(56) References Cited

U.S. PATENT DOCUMENTS

| | | | |
|---|---|---|---|
| 2007/0169003 | A1 | 7/2007 | Branda et al. |
| 2007/0171824 | A1 | 7/2007 | Ruello et al. |
| 2007/0220495 | A1 | 9/2007 | Chen et al. |
| 2007/0220515 | A1 | 9/2007 | Dewitt, Jr. et al. |
| 2007/0226139 | A1 | 9/2007 | Crumbach et al. |
| 2008/0082761 | A1 | 4/2008 | Herness et al. |
| 2008/0082796 | A1 | 4/2008 | Merten et al. |
| 2008/0091679 | A1 | 4/2008 | Herness et al. |
| 2008/0091712 | A1 | 4/2008 | Daherkar et al. |
| 2008/0148240 | A1 | 6/2008 | Jones et al. |
| 2008/0148241 | A1 | 6/2008 | Jones et al. |
| 2008/0148299 | A1 | 6/2008 | Daherkar et al. |
| 2008/0177756 | A1 | 7/2008 | Kosche et al. |
| 2008/0189687 | A1 | 8/2008 | Levine et al. |
| 2008/0196030 | A1 | 8/2008 | Buros et al. |
| 2008/0263325 | A1 | 10/2008 | Kudva et al. |
| 2008/0307441 | A1 | 12/2008 | Kuiper et al. |
| 2009/0007075 | A1 | 1/2009 | Edmark et al. |
| 2009/0044198 | A1* | 2/2009 | Kuiper et al. ............... 718/107 |
| 2009/0083002 | A1 | 3/2009 | DeWitt et al. |
| 2009/0100432 | A1 | 4/2009 | Holloway et al. |
| 2009/0106762 | A1 | 4/2009 | Accapadi et al. |
| 2009/0178036 | A1 | 7/2009 | Levine |
| 2009/0187909 | A1 | 7/2009 | Russell et al. |
| 2009/0187915 | A1 | 7/2009 | Chew et al. |
| 2009/0204978 | A1 | 8/2009 | Lee et al. |
| 2009/0210649 | A1* | 8/2009 | Wan et al. ............... 711/170 |
| 2009/0235247 | A1 | 9/2009 | Cho et al. |
| 2009/0235262 | A1 | 9/2009 | Ceze et al. |
| 2009/0241095 | A1 | 9/2009 | Jones et al. |
| 2009/0271549 | A1 | 10/2009 | Blackmore et al. |
| 2009/0292846 | A1 | 11/2009 | Park et al. |
| 2009/0300224 | A1 | 12/2009 | Duffy et al. |
| 2010/0017447 | A1 | 1/2010 | Jones et al. |
| 2010/0017581 | A1 | 1/2010 | Clift et al. |
| 2010/0017583 | A1 | 1/2010 | Kuiper et al. |
| 2010/0017584 | A1 | 1/2010 | Jones et al. |
| 2010/0017789 | A1 | 1/2010 | DeWitt, Jr. et al. |
| 2010/0017804 | A1 | 1/2010 | Gupta et al. |
| 2010/0036981 | A1 | 2/2010 | Ganesh et al. |
| 2010/0333071 | A1 | 12/2010 | Kuiper et al. |
| 2011/0307640 | A1 | 12/2011 | Jones et al. |
| 2011/0320173 | A1 | 12/2011 | Levine |
| 2012/0191893 | A1 | 7/2012 | Kuiper et al. |

FOREIGN PATENT DOCUMENTS

| | | |
|---|---|---|
| EP | 000689141 A2 | 12/1995 |
| EP | 1603307 A2 | 12/2005 |
| JP | 11-327951 | 11/1999 |
| JP | 2002-055848 | 2/2002 |
| JP | 2004-199330 | 7/2004 |
| JP | 2005-141392 | 6/2005 |
| JP | 2008-257287 | 10/2008 |
| KR | 2009098500 A | 9/2009 |
| WO | WO2009014868 | 1/2009 |

OTHER PUBLICATIONS

Mohanty-et al.; "A Hierarchical Approach for Energy Efficient Application Design Using Heterogeneous Embedded Systems"; pp. 243-255; Oct.-Nov. 2003.

Von Behren-et al.; "Capriccio: Scalable Threads for Internet Services"; ACM Digital Library; pp. 268-280; Oct. 2003.

Foong-et al.; "Architectural Characterization of Processor Affinity in Network Processing"; IEEE; 2005.

Milton, Scott; "Thread Migration in Distributed Memory Multicomputers", The Australian National University, Joint Computer Science Technical Report Series, Feb. 1998.

Abdel-Shafi, et al.; "Efficient User-Level Thread Migration and Checkpointing on Windows NT Clusters", Proceedings of the 3rd USENIX Windows NT Symposium, Jul. 12-13, 1999.

Tullsen, et al. "Handling Long-latency Loads in a Simultaneous Multithreading Processor," IEEE, 2001, pp. 318-327.

Purser, et al. "A Study of Slipstream Processors," IEEE, 2000, pp. 269-280.

Choi, et al. "Deterministic Replay of Java Mulithreaded Applications," ACM SIGMETRICS Symposium on Parallel and Distributed Tools (SPDT), Aug. 1998, pp. 48-59.

Alkalaj, et al. "Performance of Multi-Threaded Execution in a Shared-Memory Multiprocessor," IEEE, 1991, p. 330-333.

International Search Report and Written Opinion for PCT/EP2011/057574 dated Aug. 2, 2011.

IBM, "Pacing support for time Based Context Sampling," ip.com, Jan. 22, 2009.

Harkema, et al. Performance Monitoring of Java Applications, Jul. 2002.

Alexander, et al. A unifying approach to performance analysis in the java environment. IBM Systems Journal, vol. 39, No. 1, 2000.

IBM. "Process and Thread Sampling—Target Selection in Interrupt mode," ip.com, Jul. 16, 2008.

Cao, Zhongbo, et al., "A Study of Java Virtual Machine Scalability issues on SMP Systems," IEEE, Proceedings of the 2005 IEEE International Symposium on Workload Characterization. Oct. 6-8, 2005, pp. 119-128.

Chen, Liang, et al., "Resource Allocation in a Middleware for Streaming Data," Middleware 2004 Companion, 2nd Workshop on Middleware for Grid Computing, ACM, 2004, pp. 5-10.

Korochkin, Dmitry, et al., "Experimental Performance Analysis of the Ada95 and Java Parallel Program on SMP Systems," SIGAda'02, Dec. 8-12, 2002, ACM, pp. 53-56.

Tam, David, et al., "Thread Clustering: Sharing-Aware Scheduling on SMP-CMP-SMT Multiprocesors," EuroSys'07, Mar. 21-23, 2007, pp. 47-58.

International Search Report and Written Opinion dated Sep. 3, 2010 for International Application No. PCT/EP2010/058486, 8 pages.

U.S. Appl. No. 11/834,779, filed Nov. 29, 2010, 1 page.

Whaley, John, "A Portable Sampling-Based Profiler for Java Virtual Machines," Proceedings of the ACM 2000 Java Grande Conference, Jun. 3, 2000, pp. 78-87.

U.S. Appl. No. 11/549,609, filed Oct. 13, 2006 by A.R. Daherkar et al., Total 3 pp.

U.S. Appl. No. 12/824,217, filed Jun. 27, 2010 by F.E. Levine, Total 2 pp.

U.S. Appl. No. 11/549,613, filed Oct. 13, 2006 by A.R. Daherkar et al., Total 3 pp.

U.S. Appl. No. 12/813,706, filed Jun. 11, 2010 by S.T. Jones et al., Total 3 pp.

U.S. Appl. No. 13/011,621, filed Jan. 21, 2011 by K.G. Kuiper et al., Total 2 pp.

U.S. Appl. No. 12/494,469, filed Jun. 30, 2009 by K.G. Kuiper et al., Total 4 pp.

U.S. Appl. No. 11/536,962, filed Sep. 29, 2006 by E.N. Herness et al., Total 1 p.

U.S. Appl. No. 11/536,941, filed Sep. 29, 2006 by E.N. Herness et al., Total 2 pp.

Mansouri-Samani, M. and M. Sloman, "A Configurable Event Service for Distributed Systems", © 1996 IEEE, Total 8 pp.

Meyer, K., B. Gas, and J. Doughty, "The Devolution of Functional Analysis", Oct. 26, 1982, Total 26 pp.

Rinard, M.C. and P.C. Diniz, "Eliminating Synchronization Bottlenecks Using Adaptive Replication", © 2003 ACM, ACM Transactions on Programming Languages and Sysems, vol. 25, No. 3, May 2003, pp. 316-359. [Also, Total 44 pp.].

Tidwell, D., J. Snell, and P. Kulchenko, "Programming Web Services with SOAP", O'Reilly, First Edition Dec. 2001, ISBN: 0-596-00095-2, 216 pages, Total 225 pp.

Websphere 6.0.2, "Processing Events in a Sequence", IBM, [online], [Retrieved on May 12, 2011]. Retrieved from the Internet at <URL: http://publib.boulder.ibm.com/infocenter/dmndhelp/v6rxmx/topic/com.ibm.wbit.help.wirin . . . >, Oct. 7, 2005, Total 9 pp.

Amendment 1, May 30, 2012, for U.S. Appl. No. 12/813,706, filed Jun. 11, 2010 by S.T. Jones et al., Total 11 pp.

Amendment 1, Sep. 25, 2012, for U.S. Appl. No. 12/494,469, filed Jun. 30, 2009 by K.G. Kuiper et al., Total 15 pp.

Office Action 1, Oct. 9, 2012, for U.S. Appl. No. 13/011,621, filed Jan. 21, 2011 by K.G. Kuiper et al., Total 25 pp.

(56) References Cited

OTHER PUBLICATIONS

Reply Brief, Jun. 25, 2012, for U.S. Appl. No. 11/549,609, filed Oct. 13, 2006 by A.R. Daherkar et al., Total 12 pp.
Examiner's Answer, Oct. 27, 2010, for U.S. Appl. No. 11/549,613, filed Oct. 13, 2006 by A.R. Daherkar et al., Total 37 pp.
Office Action 1, Mar. 2, 2012, for U.S. Appl. No. 12/813,706, filed Jun. 11, 2010 by S.T. Jones et al., Total 21 pp.
Office Action 1, Oct. 18, 2012, U.S. Appl. No. 12/824,217, filed Jun. 27, 2010 by F.E. Levine, Total 23 pp.
Final Office Action 1, Jun. 14, 2012, for U.S. Appl. No. 12/173,047, filed Jul. 15, 2008 by K.G. Kuiper et al., Total 22 pp.
Response to Final Office Action 1, Sep. 14, 2012, for U.S. Appl. No. 12/173,047, filed Jul. 15, 2008 by K. G. Kuiper et al., Total 19 pp.
Notice of Allowance 1, Aug. 20, 2012, for U.S. Appl. No. 12/813,706, filed Jun. 11, 2010 by S.T. Jones et al., Total 8 pp.
Final Office Action 1, Nov. 6, 2012, for U.S. Appl. No. 12/494,469, filed Jun. 30, 2009 by K.G. Kuiper et al., Total 10 pp.
Amendment 2, Jan. 3, 2013, for U.S. Appl. No. 12/494,469, filed Jun. 30, 2009 by K.G. Kuiper et al., Total 12 pp.
Amendment 1, Jan. 18, 2013, for U.S. Appl. No. 12/824,217, filed Jun. 27, 2010 by F.E. Levine, Total 11 pp.
Notice of Allowance 1, Jan. 17, 2013, for U.S. Appl. No. 12/494,469, filed Jun. 30, 2009 by K.G. Kuiper et al., Total 7 pp.
Amendment 1, Feb. 5, 2013, for U.S. Appl. No. 13/011,621, filed Jan. 21, 2011 by K.G. Kuiper et al., Total 11 pp.
Arpaci-Dusseau, Andrea Carol, "Implicit Coscheduling: Coordinated Scheduling with Implicit Information in Distributed Systems", ACM Transactions on Computer Systems, vol. 19, No. 3, Aug. 2011, pp. 283-331 [Also Total 49 pp.].
Barcia, R. and J. Brent, "IBM WebSphere Developer Technical Journal: Building SOA Solutions with the Service Component Architecture—Part 1", Oct. 26, 2005, Total.
Cerami, Ethan, "Web Services Essentials", Feb. 2002, O'Reilly, First Edition, Total 286 pp.
Amendment 1, Oct. 24, 2010, for U.S. Appl. No. 11/549,609, filed on Oct. 13, 2006 by A.R. Daherkar et al., Total 16 pp.
Amendment 2, Apr. 14, 2011, for U.S. Appl. No. 11/549,609, filed Oct. 13, 2006 by A.R. Daherkar et al., Total 12 pp.
Amendment 3, Sep. 8, 2011, for U.S. Appl. No. 11/549,609, filed Oct. 13, 2006 by A.R. Daherkar et al., Total 16 pp.
Appeal Brief. Mar. 26, 2012, for U.S. Appl. 11/549,609, filed Oct. 13, 2006 by A.R. Daherkar et al., Total 22 pp.
Examiner's Answer, Apr. 26, 2012, for U.S. Appl. No. 11/549,609, filed on Oct. 13, 2006 by A.R. Daherkar et al., Total 15 pp.
Final Office Action 1, Jan. 19, 2011, for U.S. Appl. No. 11/549,609, filed Oct. 13, 2006 by A.R. Daherkar et al., Total 25 pp.
Final Office Action 2, Oct. 24, 2011, for U.S. Appl. No. 11/549,609, filed Oct. 13, 2006 by A.R. Daherkar et al., Total 23 pp.
Notice of Appeal, Jan. 24, 2012, for U.S. Appl. No. 11/549,609, filed Oct. 13, 2006 by A.R. Daherkar et al., Total 2 pp.
Office Action 1, Jul. 27, 2010, for U.S. Appl. No. 11/549,609, filed Oct. 13, 2006 by A.R. Daherkar et al., Total 22 pp.
Office Action 3, Jun. 8, 2011, for U.S. Appl. No. 11/549,609, filed Oct. 13, 2006 by A.R. Daherkar et al., Total 39 pp.
Amendment 1, Dec. 16, 2008, for U.S. Appl. No. 11/549,613, filed Oct. 13, 2006 by A.R. Daherkar et al., Total 16 pp.
Amendment 2, Jun. 16, 2009, for U.S. Appl. No. 11/549,613, filed Oct. 13, 2006 by A.R. Daherkar et al., Total 13 pp.
Amendment 3, Nov. 15, 2009, for U.S. Appl. No. 11/549,613, filed Oct. 13, 2006 by A.R. Daherkar et al., Total 12 pp.
Appeal Brief, Aug. 3, 2010, for U.S. Appl. No. 11/549,613, filed Oct. 13, 2006 by A.R. Daherkar et al., Total 26 pp.
Final Office Action 1, Mar. 16, 2009, for U.S. Appl. No. 11/549,613, filed Oct. 13, 2006 by A.R. Daherkar et al., Total 34 pp.
Final Office Action 2, Mar. 3, 2010, for U.S. Appl. No. 11/549,613, filed on Oct. 13, 2006 by A.R. Daherkar et al., Total 42 pp.
Notice of Appeal, Jun. 3, 2010, for U.S. Appl. No. 11/549,613, filed Oct. 13, 2006 by A.R. Daherkar et al., Total 2 pp.
Office Action 1, Sep. 16, 2008, for U.S. Appl. No. 11/549,613, filed Oct. 13, 2006 by A.R. Daherkar et al., Total 44 pp.
Office Action 3, Aug. 17, 2009, for U.S. Appl. No. 11/549,613, filed Oct. 13, 2006 by A.R. Daherkar et al., Total 34 pp.
Reply Brief, Dec. 27, 2010, for U.S. Appl. No. 11/549,613, filed Oct. 13, 2006 by A.R. Daherkar et al., Total 11 pp.
Amendment 1, Nov. 13, 2008, for U.S. Appl. No. 11/536,962, filed Sep. 29, 2006 by E.N. Herness et al., Total 8 pp.
Amendment 2, Jan. 8, 2009, for U.S. Appl. No. 11/536,962, filed Sep. 29, 2006 by E.N. Herness et al., Total 18 pp.
Amendment 3, Aug. 11, 2009, for U.S. Appl. No. 11/536,962, filed Sep. 29, 2006 by E.N. Herness et al., Total 24 pp.
Amendment 4, Mar. 1, 2010, for U.S. Appl. No. 11/536,962, filed Sep. 29, 2006 by E.N. Herness et al., Total 22 pp.
Amendment 5, Aug. 19, 2010, for U.S. Appl. No. 11/536,962, filed Sep. 29, 2006 by E.N. Herness et al., Total 11 pp.
Final Office Action 1, May 14, 2009, for U.S. Appl. No. 11/536,962, filed Sep. 29, 2006 by E.N. Herness et al., Total 42 pp.
Final Office Action 2, May 28, 2010, for U.S. Appl. No. 11/536,962, filed Sep. 29, 2006 by E.N. Herness et al., Total 49 pp.
Notice of Allowance 1, Sep. 7, 2010, for U.S. Appl. No. 11/536,962, filed Sep. 29, 2006 by E.N. Herness et al., Total 24 pp.
Notice of Allowance 2, Nov. 23, 2010, for U.S. Appl. No. 11/536,962, filed on Sep. 29, 2006 by E.N. Herness et al., Total 27 pp.
Office Action 1, Oct. 27, 2008, for U.S. Appl. No. 11/536,962, filed Sep. 29, 2006 by E.N. Herness et al., Total 11 pp.
Office Action 2, Dec. 24, 2008, for U.S. Appl. No. 11/536,962, filed Sep. 29, 2006 by E.N. Herness et al., Total 8 pp.
Office Action 3, Dec. 1, 2009, for U.S. Appl. No. 11/536,962, filed Sep. 29, 2006 by E.N. Herness et al., Total 39 pp.
Amendment 1, Dec. 8, 2008, for U.S. Appl. No. 11/536,941, filed Sep. 29, 2006 by E.N. Herness et al., Total 7 pp.
Amendment 2, Apr. 13, 2009, for U.S. Appl. No. 11/536,941, filed Sep. 29, 2006 by E.N. Herness et al., Total 9 pp.
Notice of Allowance 1, Jan. 14, 2009, for U.S. Appl. No. 11/536,941, filed Sep. 29, 2006 by E.N. Herness et al., Total 9 pp.
Notice of Allowance 2, May 15, 2009, for U.S. Appl. No. 11/536,941, filed Sep. 29, 2006 by E.N. Herness et al., Total 11 pp.
Notice of Allowance 3, Jun. 22, 2009, for U.S. Appl. No. 11/536,941, filed Sep. 29, 2006 by E.N. Herness et al., Total 10 pp.
Office Action 1, Nov. 14, 2008, for U.S. Appl. No. 11/536,941, filed Sep. 29, 2006 by E.N. Herness et al., Total 18 pp.
Office Action 1, Feb. 17, 2011, for U.S. Appl. No. 11/834,779, filed Aug. 7, 2007 by K.G. Kuiper et al., Total 38 pp.
Final Office Action 1, Jul. 15, 2011, for U.S. Appl. No. 11/834,779, filed Aug. 7, 2007 by K.G. Kuiper et al., Total 17 pp.
Notice of Allowance 1, Oct. 25, 2011, for U.S. Appl. No. 11/834,779, filed Aug. 7, 2007 by K.G. Kuiper et al., Total 51 pp.
Response to Office Action 1, May 17, 2011, for U.S. Appl. No. 11/834,779, filed Aug. 7, 2007 by K.G. Kuiper et al., Total 13 pp.
Response to Final Office Action 1, Oct. 17, 2011, for U.S. Appl. No. 11/834,779, filed Aug. 7, 2007 by K. G. Kuiper et al., Total 8 pp.
Office Action 1, Nov. 21, 2011, for U.S. Appl. No. 12/173,047, filed on Jul. 15, 2008 by K.G. Kuiper et al., Total 19 pp.
Response to Office Action 1, Feb. 20, 2012, for U.S. Appl. No. 12/173,047, filed Jul. 15, 2008 by K.G. Kuiper et al., Total 17 pp.
Office Action 1, Jun. 27, 2012, for U.S. Appl. No. 12/494,469, filed Jun. 30, 2009 by K.G. Kuiper et al., Total 21 pp.
Final Office Action 1, Mar. 18, 2013, for U.S. Appl. No. 13/011,621, filed Jan. 21, 2011 by K.G. Kuiper et al., Total 30 pp.
U.S. Appl. No. 12/173,047, filed Jul. 15, 2008 by K.G. Kuiper et al., Total 2 pp.
U.S. Appl. No. 11/834,779, filed Aug. 7, 2007 by K. G. Kuiper et al., Total 2 pp.
U.S. Appl. No. 12/813,706, filed Jun. 11, 2010 by S.T. Jones et al., Total 4 pp.
U.S. Appl. No. 12/824,217, filed Sep. 29, 2006 by F.E. Levine, Total 3 pp.
U.S. Appl. No. 13/011,621, filed Jan. 21, 2011 by K.G. Kuiper et al., Total 3 pp.
Final Office Action 1, Mar. 20, 2013, for U.S. Appl. No. 12/824,217, filed Jun. 27, 2010 by F.E. Levine, Total 35 pp.

(56) References Cited

OTHER PUBLICATIONS

Amendment 2, Jun. 19, 2013, for U.S. Appl. No. 12/824,217, filed Jun. 27, 2010 by F.E. Levine, Total 12 pp.
Amendment 2, Jun. 13, 2013, for U.S. Appl. No. 13/011,621, filed Jan. 21, 2011 by Kuiper et al., Total 7 pp.
Notice of Allowance 2, May 24, 2013, for U.S. Appl. No. 12/813,706, filed Jun. 11, 2010 by S.T. Jones et al., Total 14 pp.
Office Action, Apr. 25, 2013, for U.S. Appl. No. 12/173,047, filed Jul. 15, 2008 by K.G. Kuiper et al., Total 45 pp.
Notice of Allowance 1 for U.S. Appl. No. 12/173,047, dated Sep. 11, 2013, 22 pp.
Notice of Allowance 1 for U.S. Appl. No. 12/824,217, dated Sep. 27, 2013, 20 pp.
Notice of Allowance 3 for U.S. Appl. No. 12/813,706, dated Sep. 13, 2013, 11 pp.
Notice of Allowance 1, Jul. 9, 2013, for U.S. Appl. No. 13/011,621, filed on Jan. 21, 2011 by Kuiper et al., Total 11 pp.
Response to Office Action, Jul. 22, 2013, for U.S. Appl. No. 12/173,047, filed on Jul. 15, 2008 by K.G. Kuiper et al., Total 12 pp.
Office Action 1 for CN Application No. 201080010002.9, dated Sep. 4, 2013, 9 pp. (Includes copy of Information Materials for IDS Document).
Notice of Allowance, dated Nov. 12, 2013, for U.S. Appl. No. 12/494,469, filed on Jun. 30, 2009, 14 pp.
U.S. Pat. No. 7,458,078, dated Nov. 25, 2008, is an English language equivalent of CN1614555, dated May 11, 2005.
US Publication No. 2005/0102673, dated May 12, 2005, is an English language equivalent of CN1614555, dated May 11, 2005.
AIX Versions 3.2 and 4 Performance Tuning Guide, Performance Overview of the Virtual Memory Manager (VMM), Apr. 1997 http://nfosolutions.com/doc_link/C/a_doc_lib/aixbman/prftungd/vm-mov.htm, 8 pp.
Binder, "Portable and Accurate Sampling Profiling for Java", Software- Practice and Experience, vol. 36, Issue 6, May 2006, pp. 615-650.
Chanda et al., "Whodunit: Transactional Profiling for Multi-Tier Applications", ACM, EuroSys'07, Mar. 2007 Lisboa, Portugal, pp. 17-30.
Dunlavey, "Performance Tuning with Instruction-Level Cost Derived from Call-Stack Sampling", ACM SIGPLAN Notices, vol. 42(8), Aug. 2007, pp. 4-8.
Froyd et al., "Low-Overhead Call Path Profiling of Unmodified, Optimized Code", ACM, ICS'05 Cambridge, Massachusetts, pp. 81-90.
Graham et al., "gprof: a Call Graph Execution Profiler," Proceedings of the 1982 SIGPLAN Symposium on Compiler Construction, Jun. 1982m pp. 120-126.
Sun Java Real-Time System 2.001, Garbage Collection Guide, Nov. 21, 2007 http://download.oracle.com/javase/realtime/doc_2.0_u1/release/JavaRTSGarbageCollection.html, 12 pp.
Office Action 1, dated Dec. 19, 2011, for U.S. Appl. No. 12/173,053, 15 pp.
Response to Office Action 1, dated Mar. 19, 2012, for U.S. Appl. No. 12/173,053, 17 pp.
Final Office Action 1, dated May 2, 2012, for U.S. Appl. No. 12/173,053, 16 pp.
Appeal Brief, dated Jul. 23, 2012, for U.S. Appl. No. 12/173,053, 23 pp.
Notice of Allowance, dated Jun. 13, 2013, for U.S. Appl. No. 12/173,053, 13 pp.
Office Action 1, dated Jan. 5, 2012, for U.S. Appl. No. 12/173,107, 21 pp.
Response to Office Action 1, dated Mar. 30, 2012, for U.S. Appl. No. 12/173,107, 15 pp.
Notice of Allowance, dated Jun. 6, 2012, for U.S. Appl. No. 12/173,107, 10 pp.
Office Action 1, dated Feb. 2, 2011, for U.S. Appl. No. 12/235,302, 16 pp.
Response to Office Action 1, dated Apr. 20, 2011, for U.S. Appl. No. 12/235,302, 24 pp.
Final Office Action 1, dated Jul. 20, 2011, for U.S. Appl. No. 12/235,302, 17 pp.
Appeal Brief, dated Dec. 13, 2011, for U.S. Appl. No. 12/235,302, 35 pp.
Examiner's Answer, dated Feb. 27, 2012, for U.S. Appl. No. 12/235,302, 20 pp.
Reply Brief, dated Apr. 27, 2012, for U.S. Appl. No. 12/235,302, 5 pp.
Supplemental Notice of Allowance 1, dated Nov. 19, 2013, for U.S. Appl. No. 12/824,217, 6 pp.
Notice of Allowance 2, dated Dec. 9, 2013, for U.S. Appl. No. 13/011,621, 11 pp.
Response to Examination Report for GB Application No. 1212738.7, dated Dec. 11, 2013, 7 pp.
Notice of Allowance 4, dated Jan. 17, 2014, for U.S. Appl. No. 12/813,706, 13 pp.
Notice of Allowance 3, Mar. 20, 2014, for U.S. Appl. No. 13/011,621, filed on Jan. 21, 2011 by K.G. Kuiper et al., Total 20 pp.
Corrected Notice of Allowability, Apr. 25, 2014, for U.S. Appl. No. 12/824,217, filed on Jun. 27, 2010 by F.E. Levine, Total 7 pp.
Notice of Allowance 5, Apr. 24, 2014, for U.S. Appl. No. 12/813,706, filed on Jun. 11, 2010 by S.T. Jones et al., Total 10 pp.
Corrected Notice of Allowability, Apr. 7, 2014, for U.S. Appl. No. 12/824,217, filed on Jun. 27, 2010 by F.E. Levine, Total 9 pp.
U.S. Pat. No. 6,002,872, dated Dec. 14, 1999, is an English language equivalent of JP11-327951, dated Nov. 30, 1999.
U.S. Pat. No. 7,284,238, dated Oct. 16, 2007, is an English language equivalent of JP2004-199330, dated Jul. 15, 2004.
Machine Translation of JP Publication No. 2002-055848, dated Feb. 20, 2002, 23 pp.
Machine Translation of JP Publication No. 2005-141392, dated Jun. 2, 2005, 18 pp.
Machine Translation of JP Publication No. 2008-257287, dated Oct. 23, 2008, 32 pp.
Notice of Allowance 2, Feb. 14, 2014, for U.S. Appl. No. 12/824,217, filed on Jun. 27, 2010 by F.E. Levine, Total 21 pp.
Notice of Allowance 2, Nov. 20, 2013, for U.S. Appl. No. 12/173,047, filed on Jul. 15, 2008 by K.G. Kuiper et al., Total 35 pp.
US 8,589,928, 11/2013, Kuiper et al. (withdrawn)

* cited by examiner

IDLE TRANSITIONS SAMPLING WITH EXECUTION CONTEXT

BACKGROUND

1. Field

This disclosure generally relates to a computing environment. More particularly, the disclosure relates to sampling technology.

2. General Background

Either time-based or hardware event-based sampling technology is typically utilized in application profiling tools to determine the specific usage of resources. A current approach is to periodically generate an interrupt to take a sample. When the interrupt is taken, sample data is collected and recorded. Examples of the sample data are the interrupted process/thread, the instruction being executed or, optionally, the data address being accessed at the time of the sample. At a later time the collected data is aggregated, and reports are generated showing sample distribution by address, symbol, process, etc. A variety of tools are based on this technology. The full execution context of the sample is not typically recorded and not available in reports.

Attempts have been made to improve this technology by getting call stacks at the time of the sample. The existing set of tools may either attempt to walk the call stack directly or invoke functions on a separate (sampler) thread to obtain the interrupted thread's call stack. Attempting to walk the call stack at the interrupt level is not ideal, because some applications may have stacks that have been paged out. In addition, stack walking code typically does memory allocations, which are not allowed at the interrupt level. As a result, a user-mode sampling thread may be employed to walk the call stacks when requested. On multiprocessor systems, requesting that a separate thread gather the interrupted thread's call stack may allow the interrupted thread to migrate to a different processor and make forward progress, i.e., continue execution, while the call stack is being gathered. The gathered call stack will not reflect the state of the thread at the time it was interrupted.

SUMMARY

In one aspect of the disclosure, a computer program product is provided. The computer program product includes a computer useable medium having a computer readable program. The computer readable program when executed on a computer causes the computer to generate a sample based on an event. Further, the computer readable program when executed on the computer causes the computer to identify, with a dispatch monitor, a next dispatched monitored thread that is dispatched on a current processor. In addition, the computer readable program when executed on the computer causes the computer to set a processor affinity of the next dispatched monitored thread such that the next dispatched monitored thread runs only on the current processor without being able to migrate to a different processor. The computer readable program when executed on the computer also causes the computer to retrieve, with a sampler thread that runs on the current processor, a next dispatched monitored thread call stack after the processor affinity of the next dispatched monitored thread has been set to the current processor. In addition, the computer readable program when executed on the computer causes the computer to restore the processor affinity of the next dispatched monitored thread after the next dispatched monitored thread call stack has been obtained. The computer readable program when executed on the computer causes the computer to record the call stack for the next dispatched monitored thread.

In another aspect of the disclosure, a process is provided. The process generates a sample based on an event. Further, the process identifies, with a dispatch monitor, a next dispatched monitored thread that is dispatched by a current processor. In addition, the process sets the processor affinity of the next dispatched monitored thread such that the next dispatched monitored thread runs only on the current processor without being able to migrate to a different processor. The process also retrieves, with a sampler thread that runs on the current processor, a next dispatched monitored thread call stack after the processor affinity of the next dispatched monitored thread has been set to the current processor. In addition, the process restores the processor affinity of the next dispatched monitored thread after the next dispatched monitored thread call stack has been obtained. The process also records the call stack for the next dispatched monitored thread.

In yet another aspect of the disclosure, a system is provided. The system includes a current processor that generates a sample based on an event. Further, the system includes an operating system that (i) identifies, with a dispatch monitor, a next dispatched monitored thread that is dispatched by the current processor and (ii) sets the processor affinity of the next dispatched monitored thread such that the next dispatched monitored thread runs only on the current processor without being able to migrate to a different processor. In addition, the system includes a profiler that (i) retrieves, with a sampler thread that is configured to run only on the current processor, a next dispatched monitored thread call stack after the processor affinity of the next dispatched monitored thread has been set to the current processor, (ii) restores the processor affinity of the next dispatched monitored thread after the next dispatched monitored thread call stack has been obtained, and (iii) records the call stack for the next dispatched monitored thread.

In another aspect of the disclosure, a computer program product is provided. The computer program product includes a computer useable medium having a computer readable program. The computer readable program when executed on a computer causes the computer to generate a sample based on an event. Further, the computer readable program when executed on the computer causes the computer to identify, with a dispatch monitor, a last dispatched monitored thread that is dispatched by a current processor. In addition, the computer readable program when executed on the computer causes the computer to set the processor affinity of the last dispatched monitored thread such that the last dispatched monitored thread runs only on the current processor without being able to migrate to a different processor. The computer readable program when executed on the computer also causes the computer to retrieve, with a sampler thread that runs on the current processor, a last dispatched monitored thread call stack after the processor affinity of the last dispatched monitored thread has been set to the current processor. In addition, the computer readable program when executed on the computer causes the computer to restore the processor affinity of the last dispatched monitored thread after the last dispatched monitored thread call stack has been obtained. The computer readable program when executed on the computer also causes the computer to record the call stack for the last dispatched monitored thread.

DRAWINGS

The above-mentioned features of the present disclosure will become more apparent with reference to the following description taken in conjunction with the accompanying drawings wherein like reference numerals denote like elements and in which.

DETAILED DESCRIPTION

A method and system utilizes sampling technology to determine why one or more processors are not being fully utilized. Determining why an application running on the processor or processors does not scale can be very difficult. In some environments, especially those supporting transaction processing, it is important to determine the maximum transaction rate and to drive the system to fully utilize all processing resources. When the maximum transaction rate is reached, but not all processors are being fully utilized, there is some type of bottleneck preventing the full utilization. By determining the context for the last thread that was executing before a processor has gone idle, i.e., the to_idle_thread, and/or the context for the first thread executed after the processor has work to do, i.e., the from_idle_thread, information may be obtained to help to determine the cause of the bottleneck.

One approach is to gather call stacks for those threads that may have contributed to a bottleneck. That is, for example, the sampling code may simply get call stacks for only those threads that most recently ran on the processor that is idle at the time of the sample. This involves keeping track of which thread has run on which processor, in order to gather the call stacks for the right threads. However, those threads may migrate and execute on other processors while call stacks are being gathered.

Keeping all processors busy, other than the one on which the call stack will be gathered, may prevent thread migration. This could be accomplished by having sampler threads spin on those processors until the call stack is obtained for the thread of interest, but this may impair overall application performance.

Instead, by preventing the thread of interest from migrating to a different processor, which may be done in an embodiment, by setting its processor affinity to restrict it to only running on one processor, the other processors do not have to be spun so that the other processors are free to continue running the application. Thus, by preventing thread migration, there is minimal application performance degradation. Instead of severely affecting the performance of the application being profiled by waking up all sampler threads, i.e., one per processor, and having the sampler threads spin until the call stacks are retrieved, a method, system, and computer program product may set processor affinity to prevent thread migration with minimal performance impact to the application being profiled and also allow for sampling idle transitions. In one embodiment, for call stacks that have already been seen, only an occurrence count is incremented.

Either or both to_idle processing and/or from_idle processing may be utilized to set the processor affinity to prevent thread migration. A sampling approach is utilized.

Figure 1:
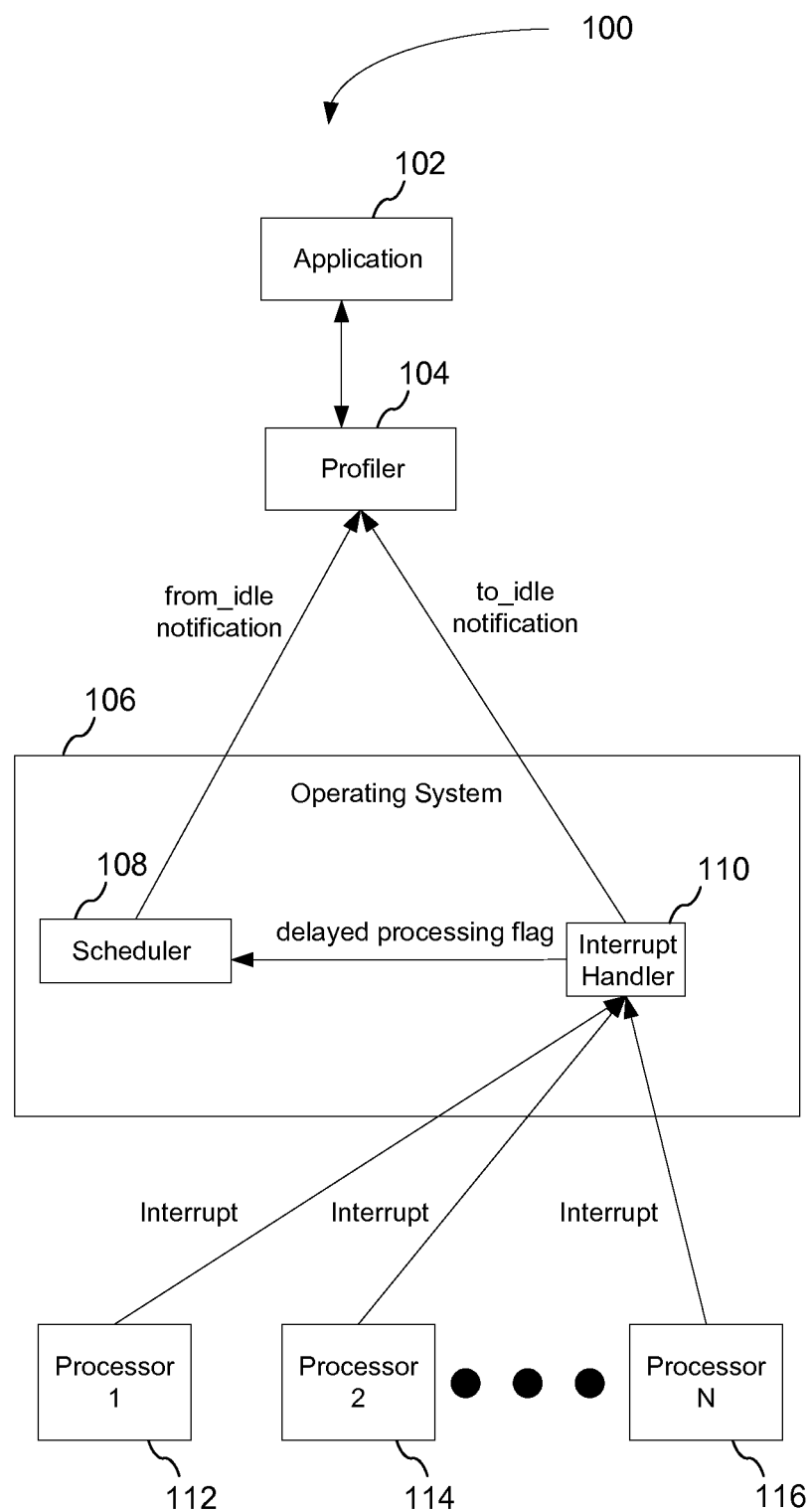
FIG. 1 illustrates a sampling system that samples idle transitions according to an embodiment of the present invention.

FIG. 1 illustrates a sampling system 100 that samples idle transitions according to an embodiment of the present invention. The sampling system 100 includes an application 102 that interacts with a profiler 104 that profiles the application 102. The profiler 104 interacts with an operating system 106. The profiler 104 helps make the determination as to why a processor is being underutilized, i.e., what is causing a processor to be idle instead of performing useful work. The processing is based on sampling when the processors are idle. Since call stacks are gathered at the time of the sample, the code that is potentially contributing to the idle state is exactly determined. The location of the code and the calling sequence that led to the code being there is determined.

Concurrent with sampling, the scheduler 108 monitors thread dispatches via dispatch monitoring code. This code is either part of the operating system or is added via a device driver or kernel extension. Information regarding the to_thread and/or from_thread may also be stored. Asynchronously from each other, a few things occur. The dispatch monitoring code is monitoring thread dispatches. Further, samples are being generated by the processors at a constant rate, i.e., time-based or at every n occurrences of an event, i.e., event-based. Also, sampler threads are listening for commands to cause them to retrieve the call stack of a thread of interest, which is performed by the profiler 104. A sampler thread is a profiler thread. Many sampler threads may be utilized as a plurality of processors may be utilized. Each sampler thread has an affinity to a single processor. Sampler threads may be very high priority threads so that they run immediately when signaled to do work such as retrieving a target thread's call stack. The target thread is the thread whose call stack is to be obtained. Further, a target processor is the processor on which the target thread was running and on which affinity is set so that the target thread remains on that processor until its call stack is obtained.

Once a determination is made as a result of sampling either to_idle or from_idle, a target thread's call stack is to be obtained. The target thread is prevented from making any forward progress during that time, unless forward progress is required in order to allow the call stack to be retrieved. In other words, the target thread is kept where it is until the call stack is gathered. Afterward, the target thread may resume.

Since call stacks are gathered by profiler sampler threads, the target thread could potentially begin running on another available processor. By the time the sampler thread begins gathering the call stack, the target thread may no longer be at the point where it was sampled, and the call stack would not accurately reflect where the target thread was at the time of the sample.

Instead of significantly hindering application performance by "boxing out" the target thread from processors other than the target processor (i.e., giving all the other processors busy work that is not useful to make them spin so that they are not available for the target thread to run on), the set of processors on which the target thread may run are restricted to the target processor. In other words, the remaining processors do not spin and may continue to do real work. Only the target processor is affected while the target thread's call stack is being retrieved. Once the target's call stack is retrieved, the target thread is allowed to run on any available processor again. The processor affinity is set so that the target thread can run only on the one processor to which it has affinity to.

The sampling system 100 may have a plurality of processors. For example, the sampling system 100 may have a first processor 112, a second processor 114, . . . , and an nth processor 116. Only one thread can run on each processor at a given time. However, that thread can potentially run on a different processor and at a different time. In the sampling system 100, one or more processors generate interrupts, either time-based or event-based. An interrupt may initiate a sample. Accordingly, each of the processors may generate an interrupt irrespective of the status of each of the other processors, e.g., being idle or not being idle. The interrupt for each processor is generated by hardware and handled by an interrupt handler 110, which determines if the processor on which the interrupt occurred is idle, i.e., if no thread is running on the particular processor, or is not idle. The interrupt handler 110 initiates the gathering of call stacks. Further, the interrupt handler may notify or signal a profiler sampler thread. In one embodiment, if the interrupt handler 110 determines that a particular processor is idle, the interrupt handler 110 may send a flag such as a deferred processing flag to a scheduler 108, which then may or may not schedule a sampler thread to be run on that particular processor to sample the target thread. To avoid thread migration during sampling, the processor affinity of a thread to a particular processor may be established. For a from_idle thread, the scheduler 108 sets the processor affinity. For a to_idle thread, the interrupt handler 110 or the profiler 104 may set the processor affinity.

During from_idle processing, a notification may be sent from the scheduler 108 to the profiler 104. The first interesting monitored thread that wakes up and runs after a processor is idle is likely to be the thread causing the bottleneck. As the system runs, the dispatch monitoring code is waiting to be told to save the next interesting thread to run, e.g., watching the setting of the deferred processing flag. The sampling code tells the dispatch monitoring code to do this by sending/setting a deferred processing flag after a sample on which the processor is idle. The dispatch monitoring code will save the first interesting/monitored thread that runs after the processor was detected to be idle in a previous sample. At the same time, as samples occur, a determination is made as to whether the processor is idle or not. If the processor is busy, nothing is done. If the processor is idle, the deferred processing flag is set for the dispatch monitoring code to begin monitoring thread dispatches and to save the next interesting/monitored thread to be scheduled on the processor. The dispatch monitoring code then clears the deferred processing flag. The sample is then completed.

The same processing may happen on more than one processor at a time. For example if two processors are idle and happen to be dispatching interesting threads at approximately the same time, then two sampler threads may retrieve call stacks at the same time.

Further, a to_idle notification may be sent from the interrupt handler 110 to the profiler 104. The last interesting/monitored thread to run on a processor before it goes to idle is likely to be affected by some resources contention. For example, the thread may not continue because it is waiting on some contended resource. No other threads are available to run after a to_idle thread. As the system runs, the dispatch monitoring code remembers the last interesting thread to run on each processor. Since the thread that is now being remembered may have been previously remembered on a different processor, it is removed from the other processors' remembered list. At the same time, periodic samples are occurring that are either time based or event based. At each sample, a determination is made as to whether the processor is idle or not. If the processor is busy, nothing is done. If the processor is idle, then a determination is made as to whether an interesting monitored thread last ran on the processor. If an interesting thread last ran on the processor, then the thread's processor affinity is set to the current processor.

In one embodiment, only the from_idle_thread is utilized. In an alternative embodiment, only the to_idle_thread is utilized. In yet another alternative embodiment, both the from_idle_thread and the to_idle_thread are utilized.

In another embodiment, a component such as a dispatch monitor may be utilized in conjunction with the scheduler 108. The dispatch monitor may be part of the operating system 106 or may be added as part of a kernel extension or device driver. In another embodiment, a component such as an interrupt back-end worker, offlevel processing worker, interrupt backend worker, or the like may be added as part of a kernel extension or device driver. The component is needed because the set of actions that can be performed at interrupt level is limited and some of the work must be deferred until a subsequent time, after the interrupt handler has completed.

The profiler 104 may retrieve the call stack, i.e., the execution context. Further, the profiler 104 may restore the processor affinity.

Figure 2A:
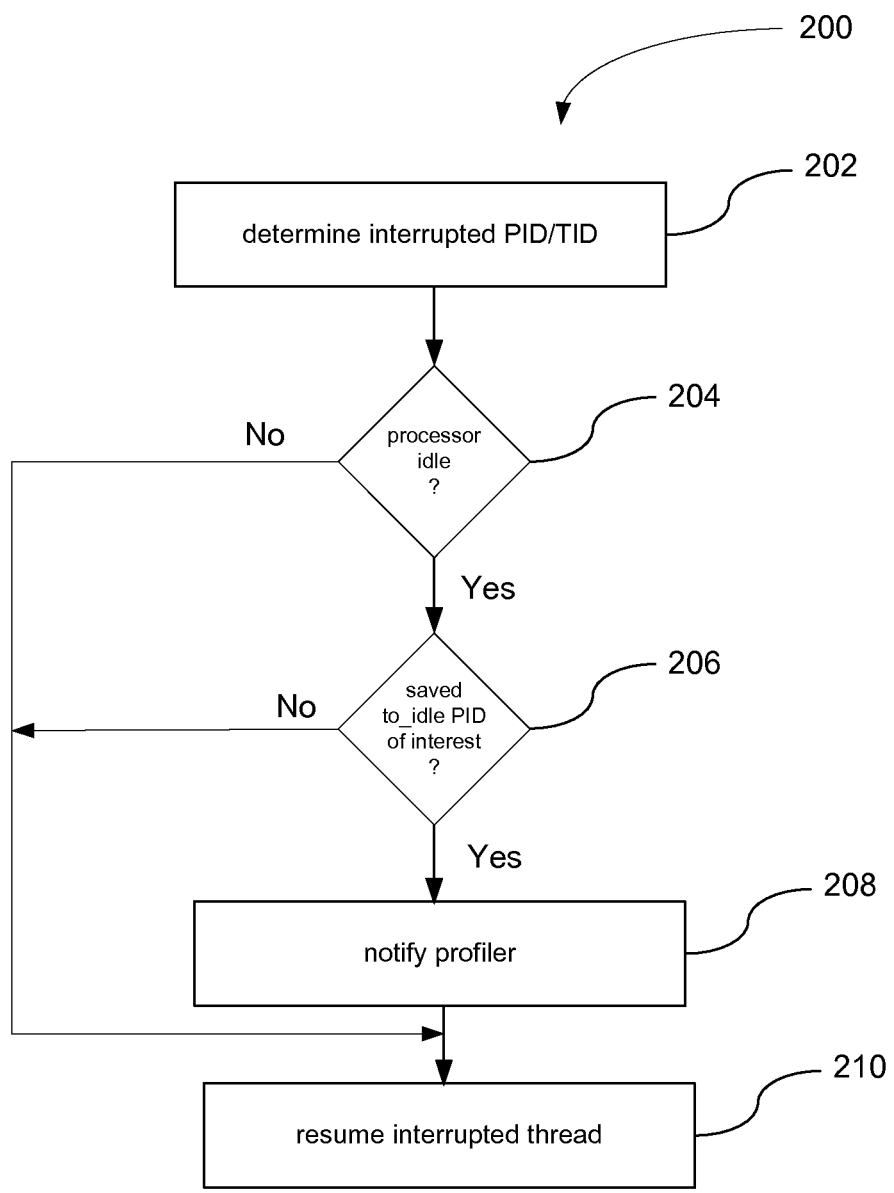
FIG. 2A illustrates a process that may be utilized by the interrupt handler for a to_idle_thread according to an embodiment of the present invention.

FIG. 2A illustrates a process 200 that may be utilized by the interrupt handler 110 for a to_idle_thread according to an embodiment of the present invention. At a process block 202, the process 200 determines an interrupted process id ("PID") and/or thread id ("TID"). Further, at a decision block 204, the process 200 determines if the microprocessor is idle. If the microprocessor is not idle, the process 200 advances to a process bock 210 to resume the interrupted thread. Alternatively, if the microprocessor is idle, the process 200 advances to a decision block 206 to determine if a saved to_idle PID, saved by the dispatch monitoring code, is of interest. If the saved to_idle PID is not of interest, the process 200 advances to the process block 210 to resume in the interrupted thread. Alternatively, if the saved to_idle PID is of interest, the process 200 advances to a process block 208 to notify the profiler. The process 200 then advances to a process block 210 to resume the interrupted thread.

Figure 2B:
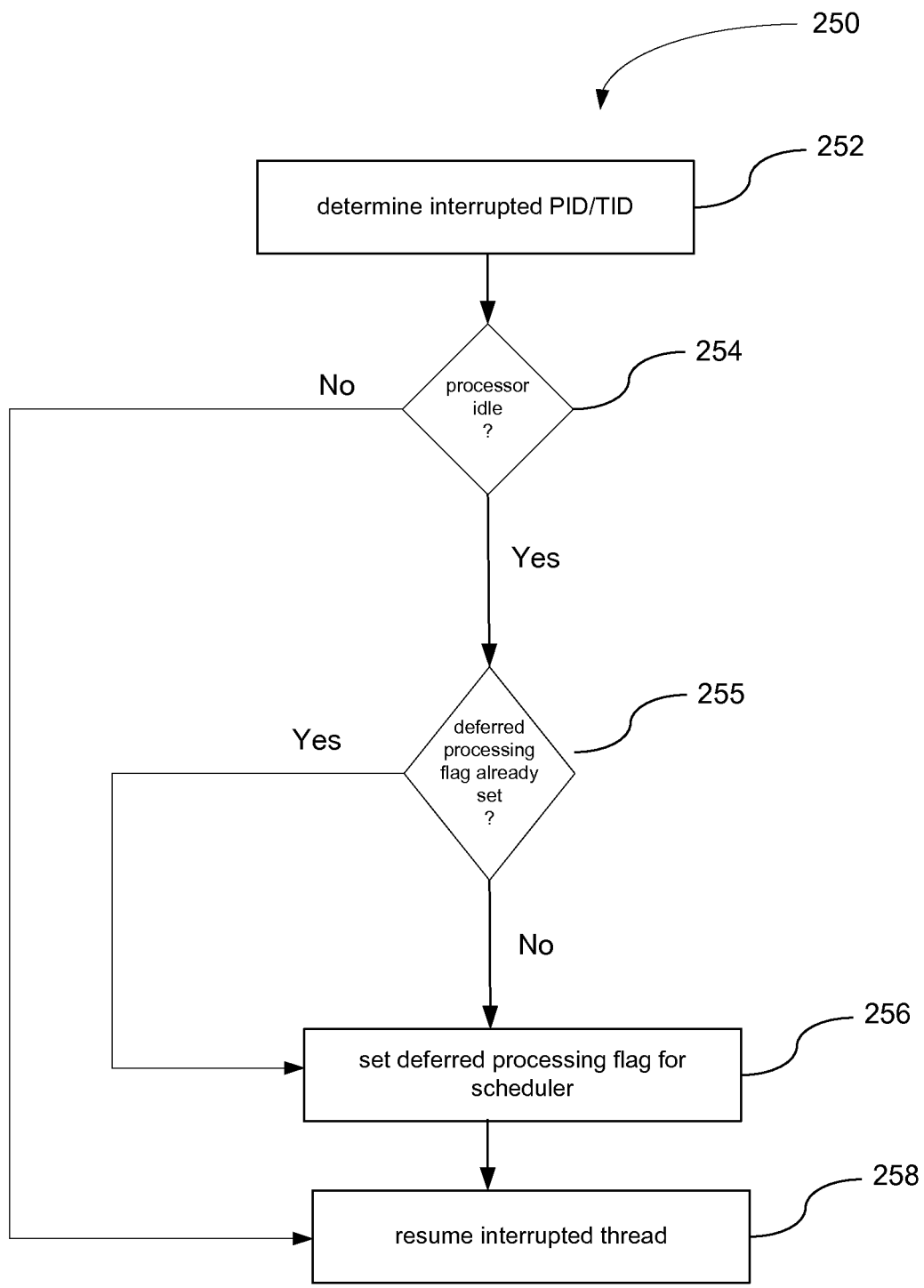
FIG. 2B illustrates a process that may be utilized by the interrupt handler for a from_idle_thread according to an embodiment of the present invention.

FIG. 2B illustrates a process 250 that may be utilized by the interrupt handler 110 for a from_idle_thread according to an embodiment of the present invention. At a process block 252, the process 250 determines an interrupted PID/TID. Further, at a decision block 254, the process 250 determines if the microprocessor is idle. If the microprocessor is not idle, the process 250 advances to a process block 258 to resume the interrupted thread. Alternatively, if the microprocessor is idle, the process 250 advances to a decision block 255 to determine if the deferred processing flag has already been set. If the deferred processing flag has already been set, the process 250 advances to the process block 258 to resume the interrupted thread. If the deferred processing flag has not already been set, the process 250 advances to a process block 256 to set a deferred processing flag for the scheduler 108. The process 250 then advances to a process block 258 to resume the interrupted thread.

Figure 3A:
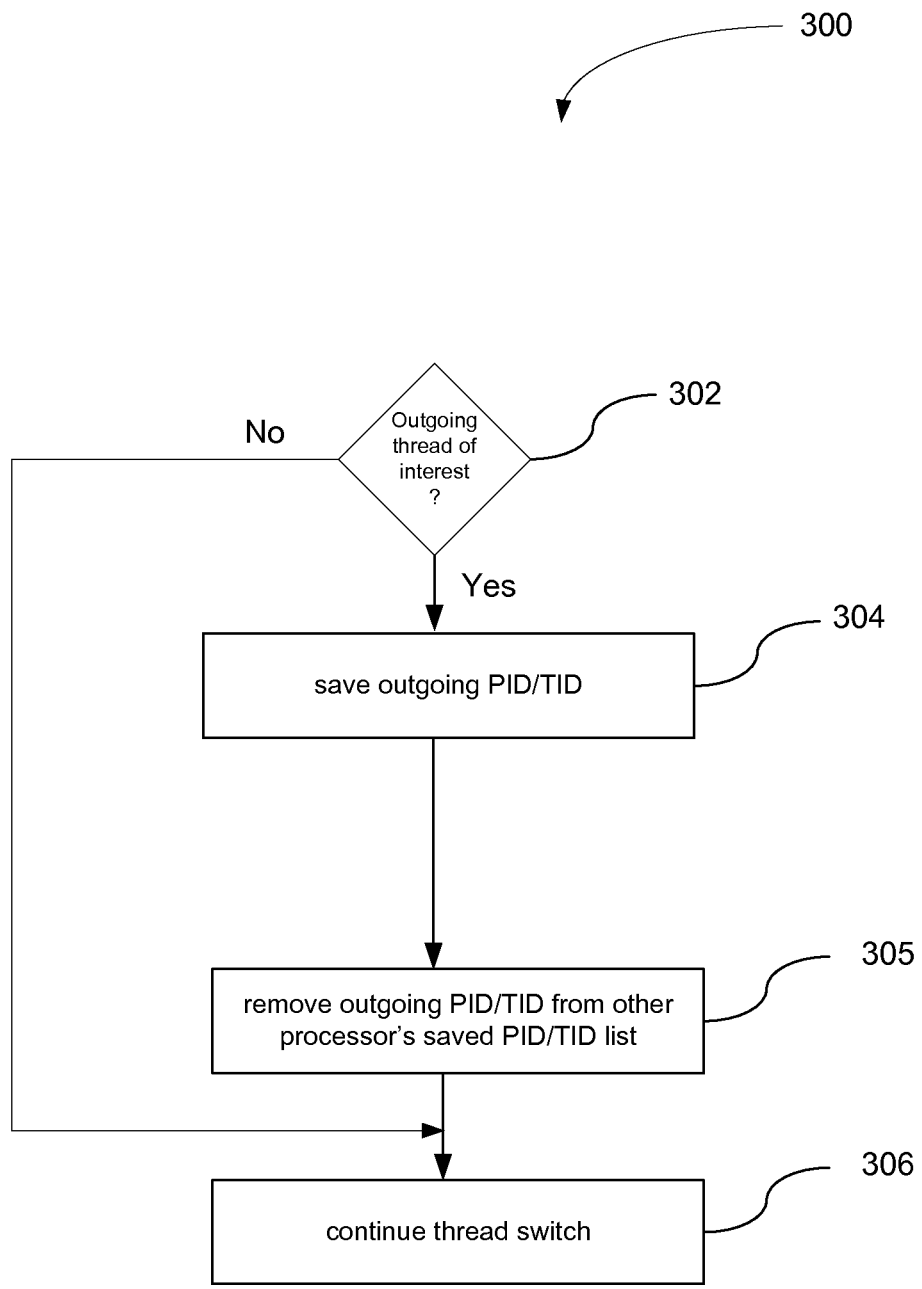
FIG. 3A illustrates a process that may be utilized by the dispatch monitoring code in the scheduler for a to_idle_thread according to an embodiment of the present invention according to an embodiment of the present invention.

FIG. 3A illustrates a process 300 that may be utilized by the scheduler 108 for a to_idle_thread according to an embodiment of the present invention. At a decision block 302, the process 300 determines if there is an outgoing thread of interest. If there is not an outgoing thread of interest, the process 300 advances to a process block 306 to continue the thread switch. If there is an outgoing thread of interest, the process 300 continues to a process block 304 to save the outgoing PID and/or TID. The process 300 then advances to a process block 305 to remove the outgoing PID/TID from the other processor's saved PID/TID list. The process 300 then proceeds to the process block 306 to continue the thread switch.

Figure 3B:
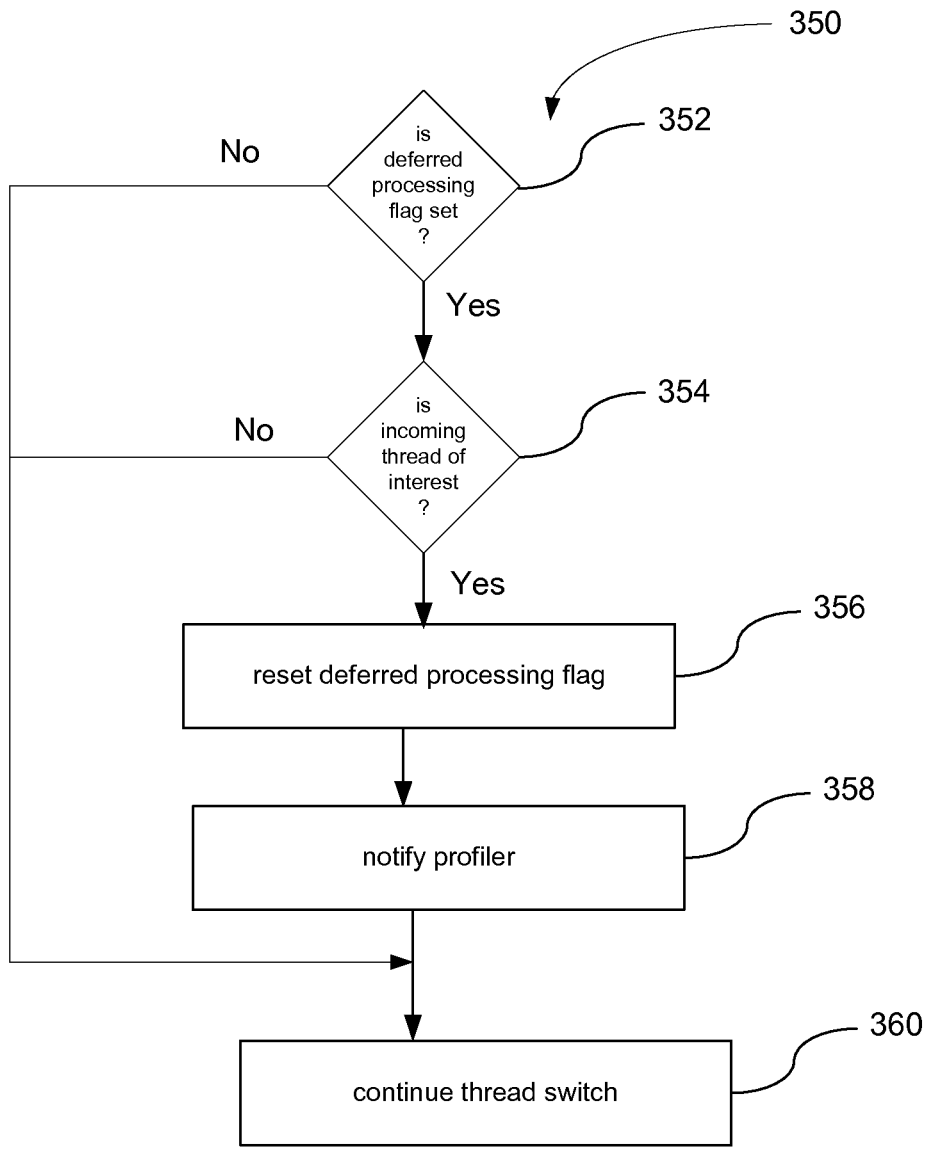
FIG. 3B illustrates a process that may be utilized by the dispatch monitoring code in the scheduler for a from_idle_thread according to an embodiment of the present invention.

FIG. 3B illustrates a process 350 that may be utilized by the scheduler 108 for a from_idle_thread according to an embodiment of the present invention. At a decision block 352, the process 350 determines if the deferred processing flag has been set. If the deferred processing flag has not been set, the process 350 advances to a process block 360 to continue the thread switch. Alternatively, if the deferred processing flag as been set, the process 350 advances to a decision block 354 to determine if there is an incoming thread of interest. If there is not an incoming thread of interest, the process 350 advances to a process block 360 to continue the thread switch. Alternatively, if there is an incoming thread of interest, the process 350 advances to a process block 356 to reset the deferred processing flag. The process 350 then advances to a process block 358 to notify the profiler 104. Further, the process 350 then advances to the process block 350 to continue the thread switch.

Figure 4:
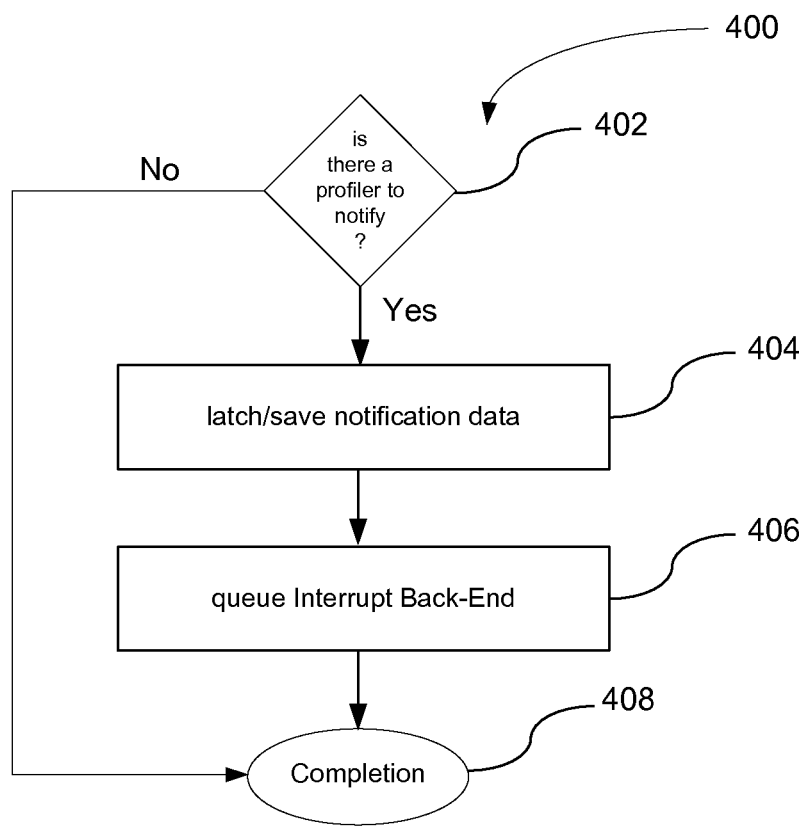
FIG. 4 illustrates a process for notifying the profiler according to an embodiment of the present invention.

FIG. 4 illustrates a process 400 for notifying the profiler 104 according to an embodiment of the present invention. At a decision block 402, the process 400 determines if there is a profiler to notify. If there is not a profiler to notify, the process 400 advances to a completion block 408. Alternatively, if there is a profiler to notify, the process 400 advances to a process block 404 to latch and/or save notification data. The process 400 advances to a process block 406 to queue the interrupt back-end. As a result, a work item is queued by the operating system 106. One of the pieces of information in that work item is the address of worker function to be run when the interrupt back-end is dequeued by the operating system 106. The process 400 then advances to a completion block 408.

Figure 5:
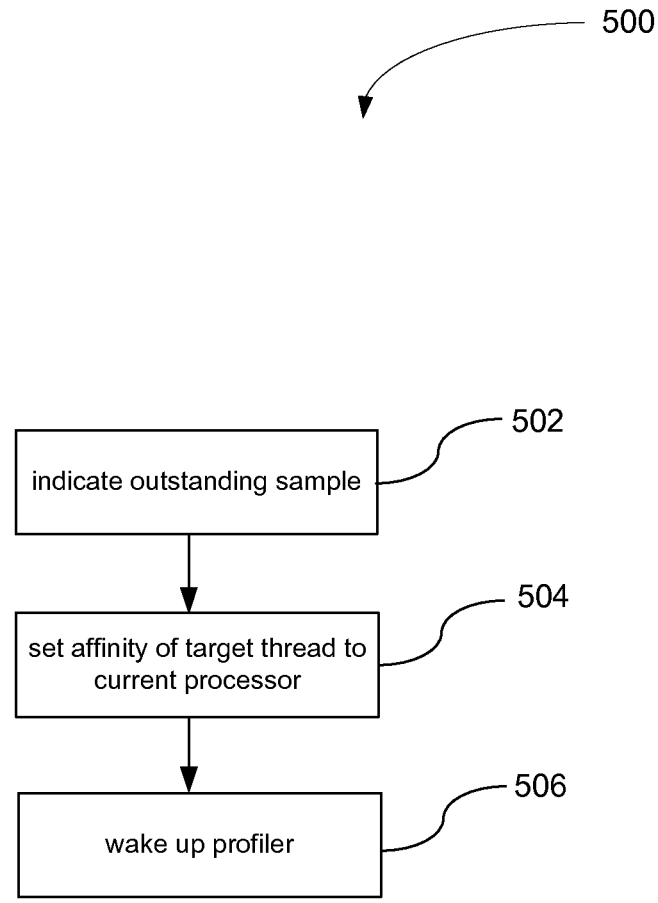
FIG. 5 illustrates a process for the interrupt back-end queued in the process block according to an embodiment of the present invention.

FIG. 5 illustrates a process 500 for the performance of the interrupt back-end in the process block 406 according to an embodiment of the present invention. At a process block 502, the process 500 indicates an outstanding sample. Further, the process 500 then advances to a process block 504 to set the processor affinity of the target thread to the current processor. In addition, the process 500 then advances to a process block 506 to wake up the profiler.

Figure 6:
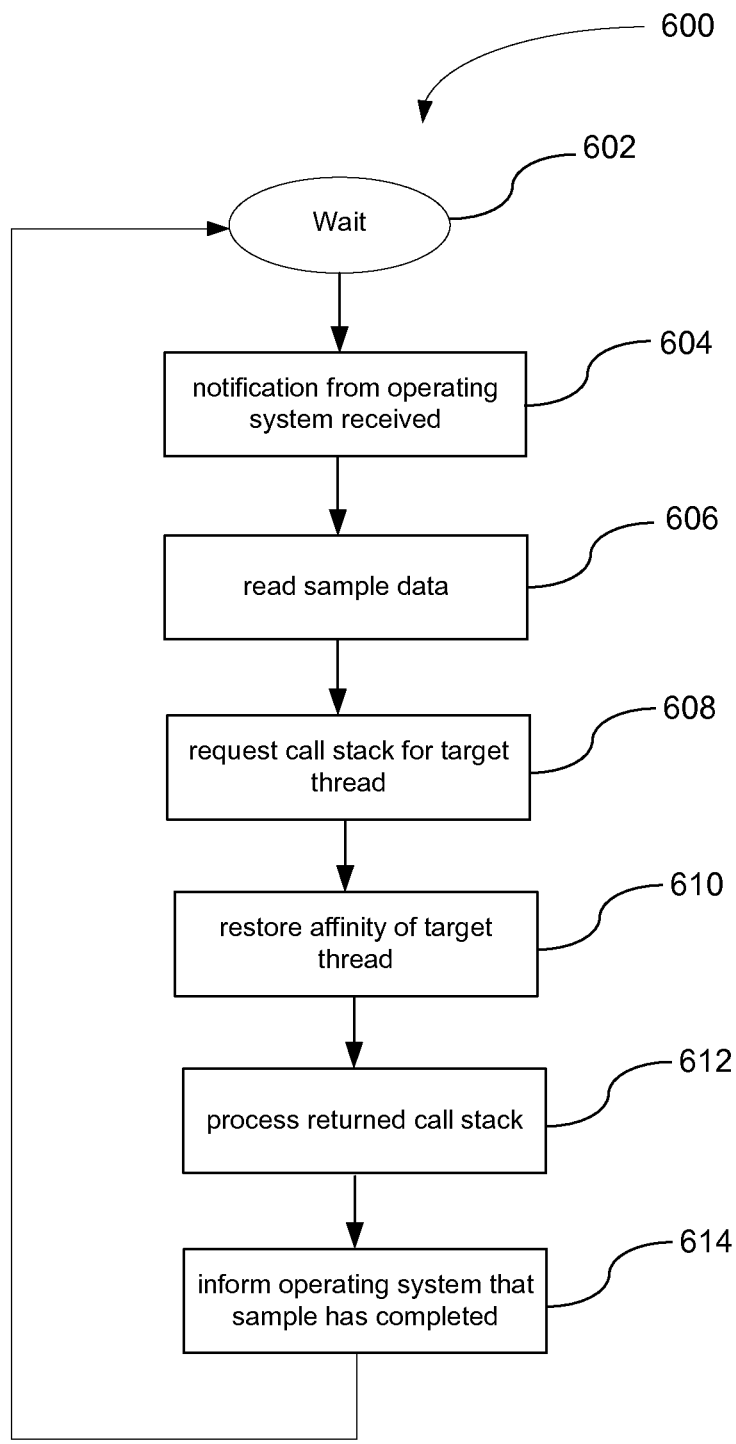
FIG. 6 illustrates a process that is performed by the profiler after being woken up as a result of process block according to an embodiment of the present invention.

FIG. 6 illustrates a process 600 performed by the profiler after being sent a signal by either the interrupt handler or by the scheduler as a result of process block 506 according to an embodiment of the present invention. At a process block 602, the process 600 has the profiler waiting for an event or signal. The event or signal comes from the interrupt handler 110 if the thread is a to_idle_thread. The event or signal comes from the scheduler 108 if the thread is a from_idle_thread. Further, at a process block 604, the process 600 receives the signal from the operating system 106. In addition, at a process block 606, the process 600 reads the sample data containing information about the target thread. At a process block 608, the process 600 requests the call stack for the target thread. Further, at a process block 610, the process 600 restores the target thread's processor affinity. At a process block 612, the process 600 processes the returned call stack. In one embodiment, the processing of the returned call stack may involve walking the returned call stack into a tree. Further, a to_idle count and/or a from_idle count may be incremented. The to_idle count or from_idle count indicates how many times the call stack, i.e., the calling sequence, has been seen ending at the leaf node. At a process block 614, the process 600 informs the operating system 106 that the sample has completed. The process 600 then returns back to the process block 602 to wait for an event or signal.

Figure 7:
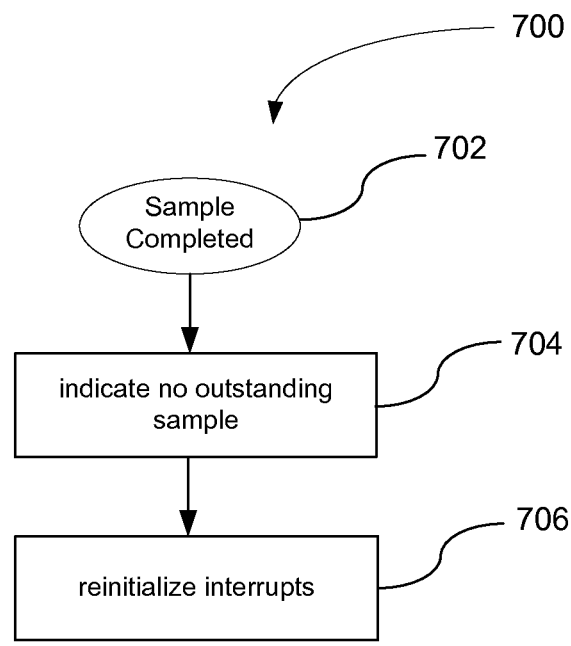
FIG. 7 illustrates a process for the profiler to inform the operating system that the sample has completed according to an embodiment of the present invention.

FIG. 7 illustrates a process 700 to inform the operating system 106 that the sample has completed according to an embodiment of the present invention. At a process block 702, a sample has been completed. Further, at a process block 704, the process 700 indicates that there is no outstanding sample. No additional samples are initiated on a processor that has an outstanding sample. In addition, at a process block 706, the process 700 reinitializes interrupts.

In one embodiment, idle transition reporting for the last monitored thread before the processor has gone idle may be supported by maintaining a last dispatched entry in a per processor table. When a time based sample occurs and the sample interrupts a processor that is idle, the sampler thread is woken and gets the call stack of the last monitored thread. Its call stack is walked into a tree and the base to_idle count of the leaf node of the call stack just inserted is incremented. In order to get a call stack of the from_idle monitored thread that reflects its state at the time it went idle, either the call stack must be retrieved at the time the processor is idle or at the time it is determined that the thread is to be dispatched, before it gets a chance to execute. In either case, the call stack for the first monitored thread dispatched after a to_idle sample is taken is walked into a tree and the base from_idle metric count of the leaf node of the call stack just inserted is incremented. Reports can be generated and viewed.

When a sample is taken and it is determined that the processor is idle, the sampling code indicates to the dispatcher monitoring code that the next dispatched monitored thread on that processor needs to be sampled. That thread is identified in the per processor control block and is not updated until the next sample is taken.

When the dispatcher monitoring code detects that a from idle thread call stack should be recorded and the thread to be dispatched is a monitored thread, then it may cause the sampler thread to be dispatched instead. In one embodiment, this may be done by queuing an interrupt back-end or Second Level Interrupt Handler with an indication to force the sampling thread to process the call stack for the monitored thread. In another embodiment, the dispatching monitoring code may directly force the sampling thread to be dispatched next with the information needed to get the call stack for the monitored thread. This information could be passed by simply updating the from idle monitored thread identification in a mapped sample data area.

If the call stack for the from_idle thread cannot be retrieved before it is dispatched, then call stacks for threads not currently being executed may be retrieved at the time the processor is idle. The stacks may be restricted to a subset, such as, only those that were last dispatched on the processor that is idle. There may be other criteria, such as, excluding threads that have not previously returned stacks or threads that are identified as daemon threads. If the from_idle thread's stack was captured at the time the processor was idle, then that previously captured call stack may be used at a later time, such as, at the next sample. The subset of threads may be restricted to only those that were last dispatched on the processor that is idle. Different sampler threads could be retrieving stacks concurrently. Some amount of logic would identify the list of threads whose call stacks are being retrieved and to ensure that they are not duplicated as a result of timing issues on a different processor.

Figure 8A:
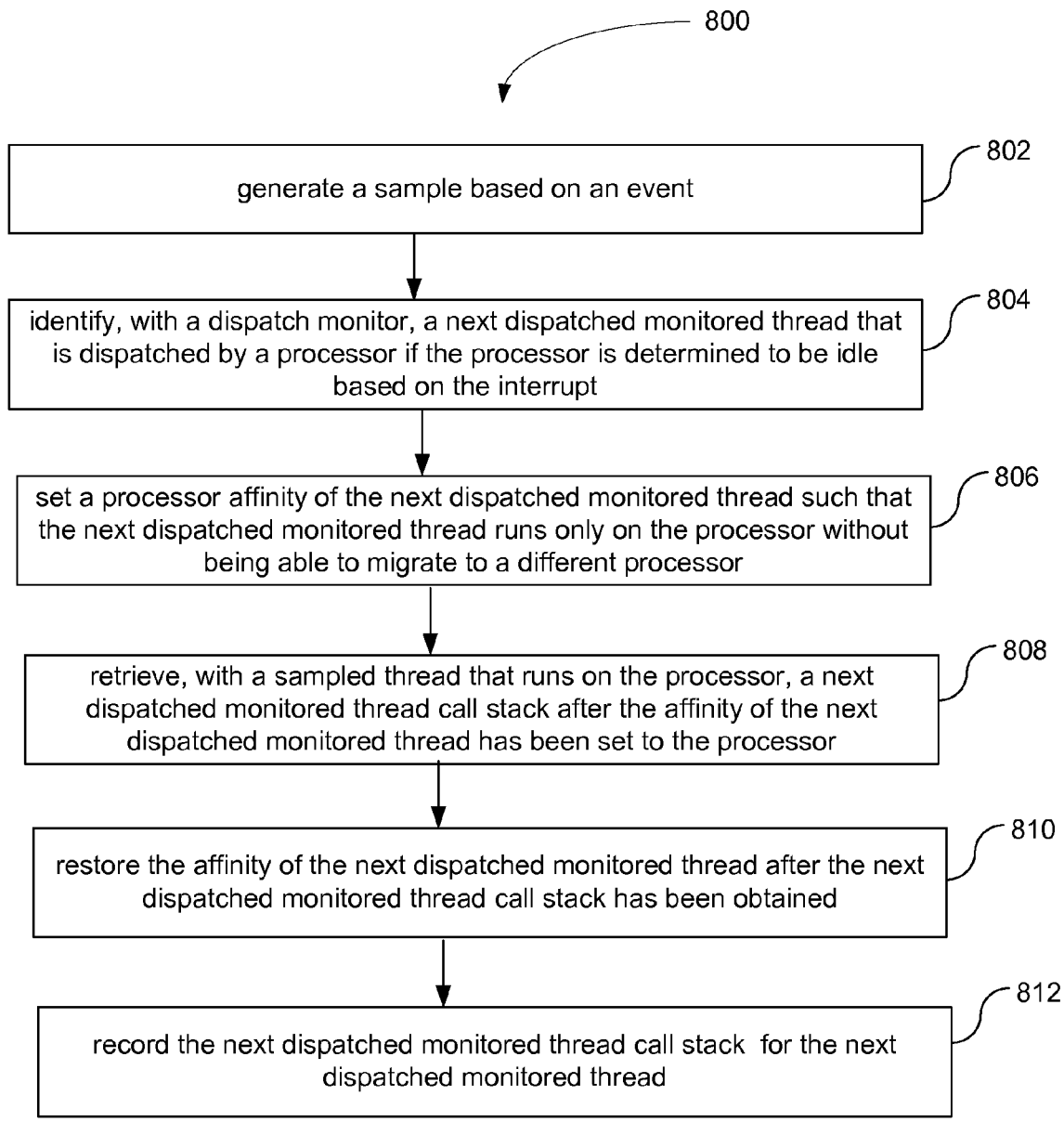
FIG. 8A illustrates a process that may be utilized for idle transitions sampling for a from_idle_thread according to an embodiment of the present invention.

FIG. 8A illustrates a process 800 that may be utilized for idle transitions sampling for a from_idle_thread according to an embodiment of the present invention. At a process block 802, the process 800 generates a sample based on an event. Further, at a process block 804, the process 800 identifies, with a dispatch monitor, a next dispatched monitored thread that is dispatched by a processor if the processor is determined to be idle based on the interrupt. In addition, at a process block 806, the process 800 sets a processor affinity of the next dispatched monitored thread such that the next dispatched monitored thread runs only on the processor without being able to migrate to a different processor. At a process block 808, the process 800 retrieves, with a sampled thread that runs on the processor, a next dispatched monitored thread call stack after the processor affinity of the next dispatched monitored thread has been set to the processor. In addition, at a process block 810, the process 800 restores the processor affinity of the next dispatched monitored thread after the next dispatched monitored thread call stack has been obtained. At a process block 812, the process 800 records the call stack for the next dispatched monitored thread. The recording may be in the form or a report.

Figure 8B:
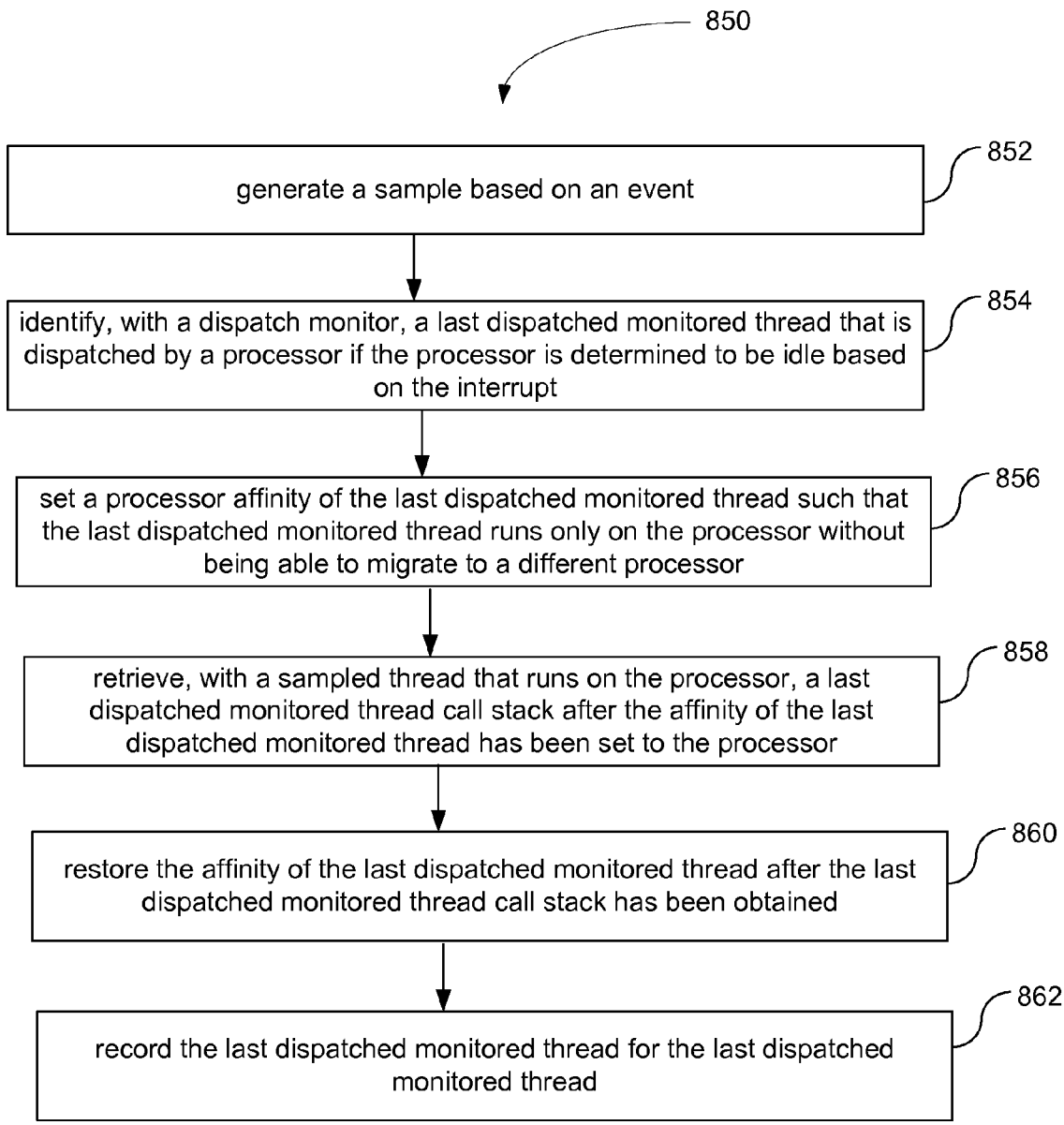
FIG. 8B illustrates a process that may be utilized for idle transitions sampling for a to_idle_thread according to an embodiment of the present invention.

FIG. 8B illustrates a process 850 that may be utilized for idle transitions sampling for a to_idle_thread according to an embodiment of the present invention. At a process block 852, the process 850 generates a sample based on an event. Further, at a process block 854, the process 850 identifies, with a dispatch monitor, a last dispatched monitored thread that is dispatched by a processor if the processor is determined to be idle based on the interrupt. In addition, at a process block 806, the process 850 sets a processor affinity of the last dispatched monitored thread such that the last dispatched monitored thread runs only on the processor without being able to migrate to a different processor. Further, at a process block 858, the process 850 obtains, through the last dispatched monitored thread call stack, an execution context for the last dispatched monitored thread. In addition, at a process block 860, the process 850 restores the processor affinity of the last dispatched monitored thread after the last dispatched monitored thread call stack has been obtained. At a process block 864, the process 850 records the call stack for the last dispatched monitored thread. The recording may be in the form of a report.

The processes described herein may be implemented in one or more general, multi-purpose or single-purpose microprocessors. Such microprocessors will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool.

Figure 9:
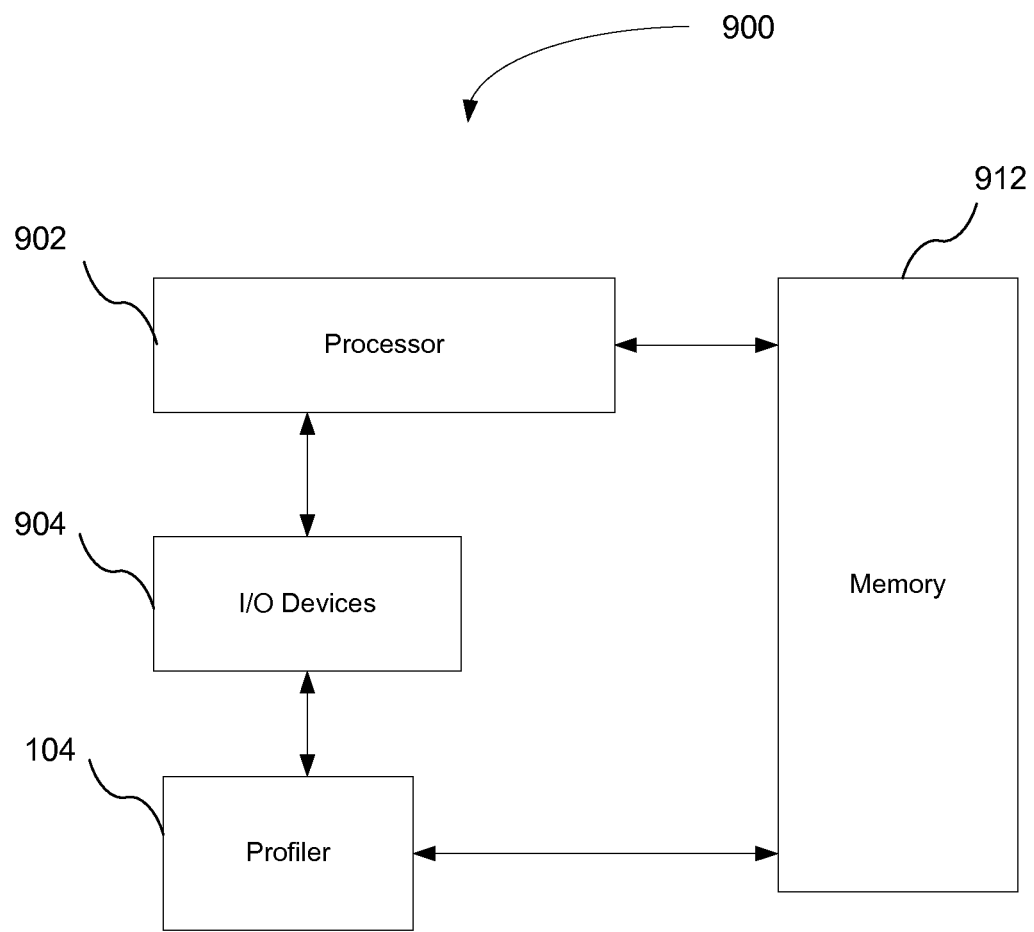
FIG. 9 illustrates a block diagram of a system that samples idle transitions according to an embodiment of the present invention.

FIG. 9 illustrates a block diagram of a system 900 that samples idle transitions according to an embodiment of the present invention. In one embodiment, the system 900 is suitable for storing and/or executing program code and is implemented using a general purpose computer or any other hardware equivalents. Thus, the system 900 comprises a processor 902 (which may be referred to as a "microprocessor"), a memory 912, e.g., random access memory ("RAM") and/or read only memory ("ROM"), the profiler 104, and various input/output devices 904.

The processor 902 is coupled, either directly or indirectly, to the memory 912 through a system bus. The memory 912 can include local memory employed during actual execution of the program code, bulk storage, and/or cache memories which provide temporary storage of at least some program code in order to reduce the number of times code must be retrieved from bulk storage during execution.

The input/output devices 904 can be coupled directly to the system 900 or through intervening input/output controllers. Further, the input/output devices 904 can include a keyboard, a keypad, a mouse, a microphone for capturing speech commands, a pointing device, and other user input devices that will be recognized by one of ordinary skill in the art. Further, the input/output devices 904 can include a receiver, transmitter, speaker, display, image capture sensor, biometric sensor, etc. In addition, the input/output devices 404 can include storage devices such as a tape drive, floppy drive, hard disk drive, compact disk ("CD") drive, digital video disk ("DVD") drive, etc.

Network adapters may also be coupled to the system 900 to enable the system 900 to become coupled to other systems, remote printers, or storage devices through intervening private or public networks. Modems, cable modems, and Ethernet cards are just a few of the currently available types of network adapters.

It should be understood that the method and system described herein can take the form of an entirely hardware embodiment, an entirely software embodiment, or an embodiment containing both hardware and software elements. If software is utilized to implement the method or system, the software can include but is not limited to firmware, resident software, microcode, etc. Although only one microprocessor is explicitly shown in the illustrated embodiment of FIG. 9, the system may have more than one microprocessor.

Any of the configurations described herein may be utilized with a virtual machine. A virtual machine may be configured to keep track of calling state and return that state referring to a virtual machine supported interface to return call stacks. For instance, information about execution of threads may be obtained through trace data. This information may include call stack information obtained from call stacks associated with threads of interest. A virtual machine may be utilized to obtain the call stack information. Various approaches may be utilized by the virtual machine to obtain the call stack information. For example, entry/exit events, an application timer tick, or instrumenting codes that sample the instrumented values may be utilized. A selected sampling thread may send a call to the virtual machine to obtain the call stack information. The selected sampling thread may make the call to the virtual machine through a virtual machine tool interface. The virtual machine tool interface may return call stack information to the sampling thread or may store the call stack information in some work area. The obtained information may be placed into a tree for later analysis.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be supplied to a processor of a general purpose computer, special purpose computer, or other programmable data processing apparatus, such that the processor and instructions provide a machine that implements functions and actions specified in the one or more flowcharts or block diagrams herein. The "processor" of a general purpose computer, special purpose computer, or other programmable data processing apparatus may be referred to herein as a "microprocessor." However, the term "microprocessor" should not be interpreted as being limited to a single-chip central processing unit or any other particular type of programmable data processing apparatus, unless explicitly so stated.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference throughout this Specification to "one embodiment," "an embodiment," or similar language means that a particular feature, structure, or characteristic described in connection with the embodiment is included in at least one embodiment of the present invention. Thus, appearances of the phrase "in one embodiment," "in an embodiment," and similar language throughout this Specification may, but do not necessarily, all refer to the same embodiment. Furthermore, the described features, structures, or characteristics of the invention may be combined in any suitable manner in one or more embodiments. Correspondingly, even if features are initially claimed as acting in certain combinations, one or more features from a claimed combination can in some cases be excised from the combination, and the claimed combination can be directed to a subcombination or variation of a subcombination.

While the apparatus and method have been described in terms of what are presently considered to be the most practical and preferred embodiments, it is to be understood that the disclosure need not be limited to the disclosed embodiments. The disclosure is intended to cover various modifications and similar arrangements included within the spirit and scope of the claims, the scope of which should be accorded the broadest interpretation so as to encompass all such modifications and similar structures. The present disclosure includes any and all embodiments of the following claims.

We claim:

1. A computer program product comprising a computer readable storage medium having a computer readable program, wherein the computer readable program when executed on a computer causes the computer to:
set a processor affinity of a next dispatched monitored thread to a first value, wherein the next dispatched monitored thread executes on a current processor without being able to migrate to a different processor while a next dispatched monitored thread call stack is being retrieved;
retrieve the next dispatched monitored thread call stack; and
restore the processor affinity of the next dispatched monitored thread to a second value after the next dispatched monitored thread call stack has been retrieved, wherein the next dispatched monitored thread migrates to a different processor to continue execution; and
record the next dispatched monitored thread call stack for a subsequently dispatched monitored thread.

2. The computer program product of claim 1, wherein the next dispatched monitored thread is dispatched by the current processor based on an event, and wherein the event is based on a predetermined event.

3. The computer program product of claim 2, wherein the predetermined event is time based.

4. The computer program product of claim 1, wherein the next dispatched monitored thread is dispatched by the current processor based on an event, and wherein the event is based on an interrupt.

5. The computer program product of claim 1, wherein the computer is further caused to:
notify a profiler that selects a sampled thread that retrieves the next dispatched monitored thread call stack.

6. The computer program product of claim 5, wherein the profiler profiles an application.

7. The computer program product of claim 1, wherein the computer is further caused to:
after recording of the next dispatched monitored thread call stack for the next dispatched monitored thread, notify an operating system that a sample has been completed.

8. A method comprising:
setting a processor affinity of a next dispatched monitored thread to a first value, wherein the next dispatched monitored thread executes on a current processor without being able to migrate to a different processor while a next dispatched monitored thread call stack is being retrieved;
retrieving the next dispatched monitored thread call stack; and
restoring the processor affinity of the next dispatched monitored thread to a second value after the next dispatched monitored thread call stack has been retrieved, wherein the next dispatched monitored thread migrates to a different processor to continue execution; and
record the next dispatched monitored thread call stack for a subsequently dispatched monitored thread.

9. The method of claim 8, wherein the next dispatched monitored thread is dispatched by the current processor based on an event, and wherein the event is based on a predetermined event.

10. The method of claim 9, wherein the predetermined event is time based.

11. The method of claim 8, wherein the next dispatched monitored thread is dispatched by the current processor based on an event, and wherein the event is based on an interrupt.

12. The method of claim 8, further comprising:
notifying a profiler that selects a sampled thread that retrieves the next dispatched monitored thread call stack.

13. The method of claim 12, wherein the profiler profiles an application.

14. The method of claim 8, further comprising:
notifying, after recording of the next dispatched monitored thread call stack for the next dispatched monitored thread, an operating system that a sample has been completed.

15. A system comprising:
processors; and
storage coupled to the processors, wherein the storage has stored thereon program code, and wherein at least one of the processors is configured to execute the program code to perform operations, wherein the operations comprise:
setting a processor affinity of a next dispatched monitored thread to a first value, wherein the next dispatched monitored thread executes on a current processor without being able to migrate to a different processor while a next dispatched monitored thread call stack is being retrieved;
retrieving the next dispatched monitored thread call stack; and
restoring the processor affinity of the next dispatched monitored thread to a second value after the next dispatched monitored thread call stack has been retrieved, wherein the next dispatched monitored thread migrates to a different processor to continue execution; and
record the next dispatched monitored thread call stack for a subsequently dispatched monitored thread.

16. The system of claim 15, wherein the next dispatched monitored thread is dispatched by the current processor based on an event, and wherein the event is based on a predetermined event.

17. The system of claim 16, wherein the predetermined event is time based.

18. The system of claim 15, wherein the next dispatched monitored thread is dispatched by the current processor based on an event, and wherein the event is based on an interrupt.

19. The system of claim 15, wherein the operations further comprise:
notifying a profiler that selects a sampled thread that retrieves the next dispatched monitored thread call stack.

20. The system of claim 19, wherein the profiler profiles an application.

21. The system of claim 15, wherein the operations further comprise:
notifying, after recording of the next dispatched monitored thread call stack for the next dispatched monitored thread, an operating system that a sample has been completed.

22. A computer program product comprising a computer readable storage medium having a computer readable program, wherein the computer readable program when executed on a computer causes the computer to:

set a processor affinity of a last dispatched monitored thread to a first value, wherein the last dispatched monitored thread executes on a current processor without being able to migrate to a different processor while a last dispatched monitored thread call stack is being retrieved;

retrieve the last dispatched monitored thread call stack; and restore the processor affinity of the next dispatched monitored thread to a second value after the next dispatched monitored thread call stack has been retrieved, wherein the next dispatched monitored thread migrates to a different processor to continue execution; and record the next dispatched monitored thread call stack for a subsequently dispatched monitored thread.

23. The computer program product of claim 22, wherein the last dispatched monitored thread is dispatched by the current processor based on an event, and wherein the event is based on a predetermined event.

24. The computer program product of claim 23, wherein the predetermined event is time based.

25. The computer program product of claim 22, wherein the last dispatched monitored thread is dispatched by the current processor based on an event, and wherein the event is based on an interrupt.

* * * * *